(12) United States Patent
Nakamura

(10) Patent No.: US 8,572,906 B2
(45) Date of Patent: Nov. 5, 2013

(54) SOLAR CELL MODULE

(75) Inventor: Moritaka Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 789 days.

(21) Appl. No.: 12/675,201

(22) PCT Filed: Sep. 2, 2008

(86) PCT No.: PCT/JP2008/065726
§ 371 (c)(1),
(2), (4) Date: Feb. 25, 2010

(87) PCT Pub. No.: WO2009/031518
PCT Pub. Date: Mar. 12, 2009

(65) Prior Publication Data
US 2010/0243035 A1  Sep. 30, 2010

(30) Foreign Application Priority Data
Sep. 3, 2007 (JP) .................................. 2007-228378

(51) Int. Cl.
*E04D 13/18* (2006.01)
*H01L 31/042* (2006.01)

(52) U.S. Cl.
USPC ........................................ 52/173.3; 136/251

(58) Field of Classification Search
USPC ............ 52/173.3, 656.1, 656.2, 656.5, 656.6; 136/243, 244, 251
IPC ..................................................... H01L 31/042
See application file for complete search history.

(56) References Cited

U.S. PATENT DOCUMENTS

| | | | |
|---|---|---|---|
| 4,392,009 A * | 7/1983 | Napoli | 136/251 |
| 4,433,200 A * | 2/1984 | Jester et al. | 136/251 |
| 6,477,816 B1 * | 11/2002 | Di Biase | 52/588.1 |
| 7,797,893 B2 * | 9/2010 | Stahl et al. | 52/220.8 |
| RE43,251 E * | 3/2012 | Anderson et al. | 52/204.54 |
| 2004/0084078 A1 | 5/2004 | Yoshida et al. | |
| 2004/0144057 A1 * | 7/2004 | Meek et al. | 52/656.2 |
| 2005/0115603 A1 * | 6/2005 | Yoshida et al. | 136/251 |

FOREIGN PATENT DOCUMENTS

| | | |
|---|---|---|
| JP | 62-1280 | 1/1987 |
| JP | 09-096071 | 4/1997 |
| JP | 10-308522 | 11/1998 |

(Continued)

OTHER PUBLICATIONS

International Search Report for PCT/JP2008/065726, mailed Sep. 30, 2008.

*Primary Examiner* — Brian Glessner
*Assistant Examiner* — Adriana Figueroa
(74) *Attorney, Agent, or Firm* — Nixon & Vanderhye, P.C.

(57) ABSTRACT

A solar cell module 1a is constituted from a main frame member 10a and a sub-frame member 20a that hold a solar cell panel 9. The main frame member 10a is constituted from a main outer wall 11, a main holding upper piece 12, a main holding lower piece 13, and a main bottom piece 16 and, also, the sub-frame member 20a is constituted from a sub-outer wall 21, a sub-holding upper piece 22, a sub-holding lower piece 23, a sub-base piece 24, a sub-inner wall 25, and a sub-bottom piece 26. Then, the main bottom piece 16 and the sub-bottom piece 26 are formed so as not to collide with each other, such that the projecting position heights of the pieces are different.

9 Claims, 36 Drawing Sheets

(56) References Cited

FOREIGN PATENT DOCUMENTS

| JP | 2001-230440 | 8/2001 |
| JP | 2002-314113 | 10/2002 |
| JP | 2003-020766 | 1/2003 |
| JP | 2004-153010 | 5/2004 |
| JP | 2004-238860 | 8/2004 |
| JP | 2006108614 A * | 4/2006 |

* cited by examiner

SOLAR CELL MODULE

This application is the U.S. national phase of International Application No. PCT/JP2008/065726, filed 2 Sep. 2008, which designated the U.S. and claims priority to Japanese Patent Application No. 2007-228378, filed Sep. 3, 2007, the entire contents of each of which are hereby incorporated by reference.

TECHNICAL FIELD

The present invention relates to a solar cell module provided with a plurality of pairs of members, each pair constituted from a main frame member that holds one side of a solar cell panel and a sub-frame member that holds an adjoining side that adjoins the one side.

BACKGROUND ART

Generally, solar cell modules are constituted from a solar cell panel and a frame member that holds this solar cell panel. As frame members used for such a solar cell module, members with various structures are known.

As the structure of the frame member, a frame member is known that has a structure provided with an outer wall perpendicularly formed along one side of the solar cell panel, and a solar cell panel holding unit that is horizontally formed at the upper part of this outer wall, and that has a U-shaped cross section.

With such a frame member, the solar cell panel is held using the frame member by inserting a side of the solar cell panel into the solar cell panel holding unit whose cross section is U-shaped, thus forming a solar cell module.

Further, in order to fix a solar cell module in an installation place, the frame member is provided with a bottom piece that horizontally projects at the lower edge of the outer wall of this frame member. As a solar cell module using such a frame member, various modules have been conventionally known (see FIGS. 1 to 3 of Patent Document 1, for example).

With the solar cell module described in Patent Document 1, a bottom piece provided at the lower edge of a frame member used for this solar cell module projects from the lower edge of the frame member toward the outer side, which is opposite the solar cell panel side (inner side).

Patent document 1: JP 119-96071A

DISCLOSURE OF INVENTION

Problems to be Solved by the Invention

Incidentally, with the solar cell module described in Patent Document 1, as described above, the bottom piece provided at the lower edge of the frame member used for this solar cell module projects from the lower edge of the frame member toward the outer side, which is opposite the solar cell panel side (inner side).

Then, to arrange and install such solar cell modules, because of the bottom piece that projects from the lower edge of the frame member toward the outer side, space for disposing this bottom piece is necessary between the solar cell module and the solar cell module installed adjacently to it. Consequently, this wastes installation space.

In view of the above, in order to solve this, a frame member has been proposed where a bottom piece of the frame member used for fixing a solar cell module projects from the lower edge of the frame member toward the solar cell panel side (inner side). FIG. 41 is a partial exploded perspective view showing the structure of a solar cell module 3 according to a conventional example using such a frame member, FIG. 42 is a partial plan view thereof, and FIG. 43 is a cross-sectional view taken along G-G in FIG. 42. FIGS. 44A to 44C, and FIGS. 45A to 45C are drawings showing the shapes of edge portions of a main frame member 50 and a sub-frame member 60 that are used for this solar cell module 3. FIGS. 44A and 45A are partial plan views, FIGS. 44B and 45B are front views, and, FIGS. 44C and 45C are partial side views, respectively. Note that a solar cell panel 9 is omitted in FIGS. 42 and 43.

The solar cell module 3 according to this conventional example has the following structure. That is, in FIGS. 41 to 45C, the solar cell panel 9 has a rectangular shape, and using two pairs of members, each pair constituted from the main frame member 50 that holds one side of this solar cell panel 9 and the sub-frame member 60 that holds an adjoining side that adjoins this one side, the solar cell panel 9 is held.

As shown in FIGS. 44A to 44C, the above-mentioned main frame member 50 is constituted from a main outer wall 31, a main holding upper piece 32, a main holding lower piece 33, a main base piece 34, a main inner wall 35, and a main bottom piece 36. The main outer wall 31 is perpendicularly formed along one side of the solar cell panel 9. The main holding upper piece 32 and the main holding lower piece 33 are provided projecting horizontally with substantially the same length, above and below, to the inner side of the upper part of the above-mentioned main outer wall 31, and hold the solar cell panel 9 fitted therebetween.

Also, the main base piece 34 is formed projecting horizontally, on the inner side of the lower edge of the main outer wall 31, along this main outer wall 31. The main inner wall 35 is formed parallel to the main outer wall 31, connecting the edge of the main base piece 34 and the edge of the main holding lower piece 33. The main bottom piece 36 is formed on the inner side of the lower edge of the main inner wall 35, along the main inner wall 35, projecting horizontally further than the main holding upper piece 32 and the main holding lower piece 33. Using this main bottom piece 36, this solar cell module 3 is fixed when installed. That is, using mounting holes provided to the main bottom piece 36, the solar cell module 3 is fixed with bolts, for instance.

Also, the sub-frame member 60 is constituted similarly to the above-mentioned main frame member 50, and is constituted from a sub-outer wall 41, a sub-holding upper piece 42, a sub-holding lower piece 43, a sub-base piece 44, a sub-inner wall 45, and a sub-bottom piece 46 as shown in FIGS. 45A to 45C. The sub-outer wall 41 is perpendicularly formed along an adjoining side that adjoins the above-mentioned one side of the solar cell panel 9. The sub-holding upper piece 42 and the sub-holding lower piece 43 are provided projecting horizontally with substantially the same length, above and below, to the inner side of the upper part of the above-mentioned sub-outer wall 41, and hold the solar cell panel 9 fitted therebetween.

Also, the sub-base piece 44 is formed projecting horizontally, on the inner side of the lower edge of the sub-outer wall 41, along this sub-outer wall 41. The sub-inner wall 45 is formed parallel to the sub-outer wall 41, connecting the edge of the sub-base piece 44 and the edge of the sub-holding lower piece 43. The sub-bottom piece 46 is formed on the inner side of the lower edge of the sub-inner wall 45, along the sub-inner wall 45, projecting horizontally further than the sub-holding upper piece 42 and the sub-holding lower piece 43. Using this sub-bottom piece 46 similarly to the main bottom piece 36, this solar cell module 3 is fixed when installed. That is, similar to the main bottom piece 36, using mounting holes provided to the sub-bottom piece 46, the solar cell module 3 is fixed with bolts, for instance.

With the above-mentioned solar cell module 3 as described above, the main bottom piece 36 of the main frame member 30 is formed projecting from the lower edge of the main inner wall 35 to the inner side, and also the sub-bottom piece 46 of the sub-frame member 40 is formed projecting from the lower edge of the sub-inner wall 45 to the inner side, respectively. Therefore, in this state, if it is attempted to cause the sides of the solar cell panel 9 to be fitted in the main frame member 30 and the sub-frame member 40, the main bottom piece 36 and the sub-bottom piece 46 collide, so that the main frame member 30 and the sub-frame member 40 cannot be connected. Accordingly, the solar cell module 3 cannot be formed.

In view of the above, with the above-mentioned solar cell module 3, by removing the main holding upper piece 32, the main holding lower piece 33, the main base piece 34, the main inner wall 35, and the main bottom piece 36 in the edge portion of the main outer wall 31 of the main frame member 50 from the end edge of the main outer wall, only for the same width as the projecting length of the sub-holding upper piece 42, the sub-holding lower piece 43, and the sub-base piece 44 of the sub-frame member 60, a flat main outer wall edge portion inner side surface 37 is formed on the inner side of the edge portion of the main outer wall 31 (see FIGS. 41, and 44A to 44C).

Furthermore, by removing the sub-bottom piece 46 in the edge portion of the sub-outer wall 41 of the sub-frame member 60 from the end edge of the sub-outer wall 41, only for the same width as the projecting length of the main bottom piece 36 of the main frame member 50, a sub-inner wall edge portion inner side surface 47 is formed on which the sub-bottom piece 46 is not projecting from the lower edge of the sub-inner wall 45, on the inner side of the edge portion of the sub-outer wall 41 (see FIGS. 41, and 45A to 45C).

Then, an edge portion end surface 6a of the edge portion of the sub-frame member 60 is abutted against the main outer wall edge portion inner side surface 37 of the main frame member 50. Also, the end surface of the main holding upper piece 32 of the main frame member 50 is abutted against the edge surface of the sub-holding upper piece 42 of the sub-frame member 60, and the end surfaces of the main holding lower piece 33, the main base piece 34, the main inner wall 35, and the main bottom piece 36 of the main frame member 50 are abutted against the sub-inner wall edge portion inner side surface 47 of the sub-frame member 60. Then, the main frame member 50 and the sub-frame member 60 are connected via screws using screw holes 39 and screw receptacles 48, thus forming the solar cell module 3 (see FIGS. 41 to 43).

As described above, with the above-mentioned solar cell module 3, when forming the solar cell module 3, in order to connect the main frame member 50 and the sub-frame member 60, it is necessary to form the main outer wall edge portion inner side surface 37 to the main frame member 50, and the sub-inner wall edge portion inner side surface 47 to the sub-frame member 60. Consequently, it is necessary to cut the edge portions of both of the main frame member 50 and the sub-frame member 60.

In view of the above, the present invention has been conceived in order to improve such circumstances. Regarding a solar cell module that is formed by abutting an edge portion of a sub-frame member against an edge portion of a main frame member so as to connect the main frame member and the sub-frame member, the present invention is aimed at providing a solar cell module that can be constituted using a frame member with a bottom piece of the frame member projecting from the lower edge of the frame member toward the solar cell panel side (inner side) that is used for fixing the solar cell module and, also, needing the edge portion of only either the main frame member or the sub-frame member to be cut.

Means for Solving the Problems

A first solar cell module of the present invention is a solar cell module that holds a solar cell panel using a plurality of pairs of members, each pair constituted from a main frame member that holds one side of the solar cell panel and a sub-frame member that holds an adjoining side that adjoins the one side.

The above-mentioned main frame member is constituted from a main outer wall, a main holding upper piece, a main holding lower piece, and a main bottom piece. Among these, the main outer wall is formed along one side of the solar cell panel. The main holding upper piece and the main holding lower piece are provided projecting inward, above and below, to an inner side of an upper part of the main outer wall, and has a function of holding the solar cell panel fitted therebetween. The main bottom piece is formed on an inner side of the main outer wall below the main holding lower piece along the main outer wall, projecting further inward than the main holding upper piece and the main holding lower piece.

The above-mentioned sub-frame member is constituted from a sub-outer wall, a sub-holding upper piece, a sub-holding lower piece, a sub-base piece, a sub-inner wall, and a sub-bottom piece. Among these, the sub-outer wall is formed along the adjoining side of the solar cell panel. The sub-holding upper piece and the sub-holding lower piece are provided projecting inward, above and below, to an inner side of an upper part of the sub-outer wall, and has a function of holding the solar cell panel fitted therebetween. The sub-base piece is formed projecting inward on an inner side of a lower edge of the sub-outer wall along the sub-outer wall. The sub-inner wall is formed parallel to the sub-outer wall connecting the sub-base piece and the sub-holding lower piece. The sub-bottom piece is formed on an inner side of the sub-inner wall along the sub-inner wall, projecting further inward than the sub-holding upper piece and the sub-holding lower piece.

With the above-mentioned first solar cell module, by removing the main holding upper piece and the main holding lower piece in an edge portion of the main outer wall of the main frame member from an end edge of the main outer wall, for substantially a same width as a projecting length of the sub-holding upper piece and the sub-holding lower piece of the sub-frame member, a flat main outer wall edge portion inner side surface is formed on an inner side of the edge portion of the main outer wall, and an end surface of an edge portion of the sub-frame member is abutted against the main outer wall edge portion inner side surface, connecting the main frame member and the sub-frame member. At this time, with the above-mentioned solar cell module, the main bottom piece of the main frame member and the sub-bottom piece of the sub-frame member are formed so as not to collide with each other, such that the projecting position heights of the main bottom piece and the sub bottom piece are different.

With the above-mentioned first solar cell module, as described above, the main bottom piece of the main frame member and the sub-bottom piece of the sub-frame member are formed so as not to collide with each other, such that the projecting position heights of the pieces are different.

Accordingly, with the above-mentioned first solar cell module, if only the flat main outer wall edge portion inner side surface is formed on the inner side of the edge portion of the main outer wall by removing the main holding upper piece and the main holding lower piece in the edge portion of the main outer wall of the main frame member from the end edge of the main outer wall, for the same width as the projecting length of the sub-holding upper piece and the sub-holding lower piece of the sub-frame member, it is possible to connect the main frame member and the sub-frame member by abutting the end surface of the edge portion of the sub-frame member against the main outer wall edge portion inner side surface. That is, if only the main outer wall edge portion inner side surface is formed by cutting the edge portion of the main outer wall of the main frame member, it is possible to connect the main frame member and the sub-frame member.

Note that in this case, generally, it is preferable to use either the main bottom piece or the sub-bottom piece, whose projecting position height is lower, to fix the solar cell module. Therefore, regarding the solar cell module that is formed by abutting the edge portion of the sub-frame member against the edge portion of the main frame member so as to connect the main frame member and the sub-frame member, the solar cell module can be constituted using a frame member with a bottom piece of the frame member projecting from the lower edge of the frame member toward the solar cell panel side (inner side) that is used for fixing the solar cell module and, also, needing the edge portion of only either the main frame member or the sub-frame member to be cut.

Similar to the above-mentioned first solar cell module, a second solar cell module of the present invention is a solar cell module that holds a solar cell panel using a plurality of pairs of members, each pair constituted from a main frame member that holds one side of the solar cell panel, and a sub-frame member that holds an adjoining side that adjoins this one side.

The above-mentioned main frame member is constituted from a main outer wall, a main holding upper piece, a main holding lower piece, and a main bottom piece, similar to the above-mentioned first solar cell module. Among these, the main outer wall is formed along one side of the solar cell panel. The main holding upper piece and the main holding lower piece are provided projecting inward, above and below, to an inner side of an upper part of the main outer wall, and has a function of holding the solar cell panel fitted therebetween. The main bottom piece is formed on an inner side of the main outer wall below the main holding lower piece along the main outer wall, projecting further inward than the main holding upper piece and the main holding lower piece.

Differing from the above-mentioned first solar cell module, the above-mentioned sub-frame member is constituted from a sub-outer wall, a sub-holding upper piece, a sub-holding lower piece, and a sub-bottom piece. Among these, the sub-outer wall is formed along the adjoining side of the solar cell panel. The sub-holding upper piece and the sub-holding lower piece are provided projecting inward, above and below, to an inner side of an upper part of the sub-outer wall, and has a function of holding the solar cell panel fitted therebetween. The sub-bottom piece is formed on an inner side of the sub-outer wall below the sub-holding lower piece along the sub-outer wall, projecting further inward than the sub-holding upper piece and the sub-holding lower piece.

With the above-mentioned second solar cell module, by removing the main holding upper piece and the main holding lower piece in an edge portion of the main outer wall of the main frame member from an end edge of the main outer wall, for substantially a same width as a projecting length of the sub-holding upper piece and the sub-holding lower piece of the sub-frame member, a flat main outer wall edge portion inner side surface is formed on an inner side of the edge portion of the main outer wall, and an end surface of an edge portion of the sub-frame member is abutted against the main outer wall edge portion inner side surface, connecting the main frame member and the sub-frame member. At this time, similar to the above-mentioned first solar cell module, with the above-mentioned second solar cell module, the main bottom piece of the main frame member and the sub-bottom piece of the sub-frame member are formed so as not to collide with each other, such that the projecting position heights of the main bottom piece and the sub-bottom piece are different.

Similar to the above-mentioned first solar cell module, with the above-mentioned second solar cell module, the main bottom piece of the main frame member and the sub-bottom piece of the sub-frame member are formed so as not to collide with each other, such that the projecting position heights of the pieces are different.

Accordingly, with the above-mentioned second solar cell module, if only the flat main outer wall edge portion inner side surface is formed on the inner side of the edge portion of the main outer wall by removing the main holding upper piece and the main holding lower piece in the edge portion of the main outer wall of the main frame member from the end edge of the main outer wall, for the same width as the projecting length of the sub-holding upper piece and the sub-holding lower piece of the sub-frame member, it is possible to connect the main frame member and the sub-frame member by abutting the end surface of the edge portion of the sub-frame member against the main outer wall edge portion inner side surface. That is, if only the main outer wall edge portion inner side surface is formed by cutting the edge portion of the main outer wall of the main frame member, it is possible to connect the main frame member and the sub-frame member.

Note that in this case, similar to the above-mentioned first solar cell module, generally, it is preferable to use either the main bottom piece or the sub-bottom piece whose projecting position height is lower, to fix the solar cell module. Therefore, regarding the solar cell module that is formed by abutting the edge portion of the sub-frame member against the edge portion of the main frame member so as to connect the main frame member and the sub-frame member, the solar cell module can be constituted using a frame member with a bottom piece of the frame member projecting from the lower edge of the frame member toward the solar cell panel side (inner side) that is used for fixing the solar cell module and, also, needing the edge portion of only either the main frame member or the sub-frame member to be cut.

With the above-mentioned first solar cell module or second solar cell module, the main bottom piece of the main frame member may be formed projecting on an inner side of a lower edge of the main outer wall, and the solar cell module may be fixed using the main bottom piece when installed. Also, the sub-bottom piece of the sub-frame member may be formed projecting inward, so as to be positioned above the main bottom piece. In this way, when connecting the main frame member and the sub-frame member, it is possible to avoid the main bottom piece of the main frame member and the sub-bottom piece of the sub-frame member colliding with each other.

It is also sufficient to constitute, as follows, the above-mentioned first solar cell module or second solar cell module, that is, the solar cell module with the main bottom piece of the main frame member being formed projecting on the inner side of the lower edge of the main outer wall, the main bottom piece being used for fixing the solar cell module when installed, and the sub-bottom piece of the sub-frame member being formed projecting inward so as to be positioned above the main bottom piece.

That is, a protrusion for reinforcement is formed on a joint at which the main bottom piece of the main frame member projects from the lower edge of the main outer wall, and the sub-bottom piece of the sub-frame member is formed projecting inward so as to be positioned above the protrusion for reinforcement, in order not to collide with the protrusion for reinforcement.

In this way, since a protrusion for reinforcement is formed on a joint at which the main bottom piece of the main frame member projects from the lower edge of the main outer wall, the strength of the main frame member can be increased. Further, since the sub-bottom piece of the sub-frame member is formed projecting inward so as to be positioned above the protrusion for reinforcement, it is possible to avoid the sub-bottom piece of the sub-frame member colliding with the protrusion for reinforcement.

It is also sufficient to constitute, as follows, the above-mentioned first solar cell module or second solar cell module, that is, the solar cell module with the main bottom piece of the main frame member being formed projecting on the inner side of the lower edge of the main outer wall, the main bottom piece being used for fixing the solar cell module when installed, and the sub-bottom piece of the sub-frame member being formed projecting inward so as to be positioned above the main bottom piece.

That is, the sub-bottom piece of the sub-frame member is formed such that a lower surface near a side end of the sub-bottom piece abuts against an upper surface near a side end of the main bottom piece of the main frame member. In this way, of gravity of the above-mentioned first solar cell module or second solar cell module, gravity on the sub-frame member can be transferred to the main bottom piece that is formed at the lower edge of the main outer wall, and that is used for fixing the solar cell module when installed. Accordingly, the above-mentioned first solar cell module or second solar cell module can be stably installed.

Regarding the above-mentioned solar cell modules, it is also sufficient to constitute the above-mentioned solar cell modules such that the roles of the main frame member and the sub-frame member are the opposites of the roles described above. That is, the sub-bottom piece of the sub-frame member is formed projecting on an inner side of a lower edge of the sub-inner wall with the above-mentioned first solar cell module, and is formed projecting on an inner side of a lower edge of the sub-outer wall with the above-mentioned second solar cell module, and the solar cell module is fixed using the sub-bottom piece when installed. Then, the main bottom piece of the main frame member is formed projecting on the inner side of the main outer wall, so as to be positioned above the sub-bottom piece. In this case, the main bottom piece of the main frame member may be formed such that a lower surface near a side end of the main bottom piece abuts against an upper surface near a side end of the sub-bottom piece of the sub-frame member.

It is also possible to improve a solar cell module according to a conventional example by adopting the above-mentioned mechanism, that is, the mechanism of the above-mentioned solar cell module in which the main bottom piece of the main frame member and the sub-bottom piece of the sub-frame member are formed so as not to collide with each other, such that the projecting position heights of the pieces are different, in the solar cell module according to the conventional example described above.

This improved solar cell module is a solar cell module that holds a solar cell panel using a plurality of pairs of members, each pair constituted from a main frame member that holds one side of the solar cell panel, and a sub-frame member that holds an adjoining side that adjoins the one side, similar to the above-mentioned solar cell module.

The above-mentioned main frame member is constituted from a main outer wall, a main holding upper piece, a main holding lower piece, a main base piece, a main inner wall, and a main bottom piece. Among these, the main outer wall is formed along one side of the solar cell panel. The main holding upper piece and the main holding lower piece are provided projecting inward, above and below, to an inner side of an upper part of the main outer wall, and has a function of holding the solar cell panel fitted therebetween. The main base piece is formed projecting inward, on an inner side of a lower edge of the main outer wall along the main outer wall. The main inner wall is formed so as to be formed parallel to the main outer wall, connecting the main base piece and the main holding lower piece. The main bottom piece is formed on an inner side of a lower edge of the main inner wall along the main inner wall, projecting further inward than the main holding upper piece and the main holding lower piece.

The above-mentioned sub-frame member is constituted in a substantially similar manner to the above-mentioned main frame member, and is constituted from a sub-outer wall, a sub-holding upper piece, a sub-holding lower piece, a sub-base piece, a sub-inner wall, and a sub-bottom piece. Among these, the sub-outer wall is formed along the adjoining side of the solar cell panel. The sub-holding upper piece and the sub-holding lower piece are provided projecting inward, above and below, to an inner side of an upper part of the sub-outer wall, and has a function of holding the solar cell panel fitted therebetween. The sub-base piece is formed projecting inward on an inner side of a lower edge of the sub-outer wall along the sub-outer wall. The sub-inner wall is formed parallel to the sub-outer wall, connecting the sub-base piece and the sub-holding lower piece. The sub-bottom piece is formed on an inner side of the sub-inner wall along the sub-inner wall, projecting further inward than the sub-holding upper piece and the sub-holding lower piece.

With the above-mentioned solar cell module, it is preferable to fix the solar cell module using the main bottom piece of the main frame member when installed. By removing the main holding upper piece, the main holding lower piece, the main inner wall, the main base piece, and the main bottom piece in an edge portion of the main outer wall of the main frame member from an end edge of the main outer wall, for a same width as a projecting length of the sub-holding upper piece and the sub-holding lower piece of the sub-frame member, a flat main outer wall edge portion inner side surface is formed on an inner side of the edge portion of the main outer wall. Then, an end surface of an edge portion of the sub-frame member is abutted against the main outer wall edge portion inner side surface, connecting the main frame member and the sub-frame member.

At this time, the sub-bottom piece of the sub-frame member is formed projecting on the inner side of the sub-inner wall, so as to be positioned above the main bottom piece of the main frame member, and in the main inner wall, a slit that has a same length as a projecting length of the sub-bottom piece is formed at a same height position as a projecting position of the sub-bottom piece, and when the main frame member and the sub-frame member are connected, the above-mentioned sub-bottom piece is inserted into the slit.

With the above-mentioned solar cell module, as described above, the sub-bottom piece of the sub-frame member is formed projecting on the inner side of the sub-inner wall, so as to be positioned above the main bottom piece of the main frame member, and in the main inner wall, a slit that has the same length as the projecting length of the sub-bottom piece is formed at the same height position as the projecting position of the sub-bottom piece, and when the main frame member and the sub-frame member are connected, the above-mentioned sub-bottom piece is inserted into the slit. In this way, when connecting the main frame member and the sub-frame member, it is possible to avoid the main bottom piece of the main frame member and the sub-bottom piece of the sub-frame member colliding with each other.

Also, with the above-mentioned solar cell module, as described above, by removing the main holding upper piece, the main holding lower piece, the main inner wall, the main base piece, and the main bottom piece in the edge portion of the main outer wall of the main frame member from the end edge of the main outer wall of the main frame member, for the same width as the projecting length of the sub-holding upper piece and the sub-holding lower piece of the sub-frame member, the flat main outer wall edge portion inner side surface informed on the inner side of the edge portion of the main outer wall. Then, the end surface of the edge portion of the sub-frame member is abutted against the main outer wall edge portion inner side surface, and the main frame member and the sub-frame member are connected. That is, if only the main outer wall edge portion inner side surface is formed by cutting the edge portion of the main outer wall of the main frame member, it is possible to connect the main frame member and the sub-frame member.

Therefore, regarding the solar cell module that is formed by abutting the edge portion of the sub-frame member against the edge portion of the main frame member so as to connect the main frame member and the sub-frame member, it is possible to constitute a solar cell module that can be constituted using a frame member with a bottom piece of the frame member projecting from the lower edge of the frame member toward the inner side that is used for fixing the solar cell module and, also, needing the edge portion of only either the main frame member or the sub-frame member to be cut.

Effects of the Invention

According to the solar cell module of the present invention, a main bottom piece of a main frame member, and a sub-bottom piece of a sub-frame member are formed so as not to collide with each other, such that the projecting position heights of the pieces are different. Accordingly, if only a main outer wall edge portion inner side surface is formed by cutting the edge portion of a main outer wall of the main frame member, it is possible to connect the main frame member and the sub-frame member.

Therefore, regarding the solar cell module that is formed by abutting the edge portion of the sub-frame member against the edge portion of the main frame member so as to connect the main frame member and the sub-frame member, the solar cell module can be constituted using a frame member with a bottom piece of the frame member projecting from the lower edge of the frame member toward the inner side that is used for fixing the solar cell module and, also, needing the edge portion of only the main frame member to be cut, among the main frame member and the sub-frame member.

Figure 1:
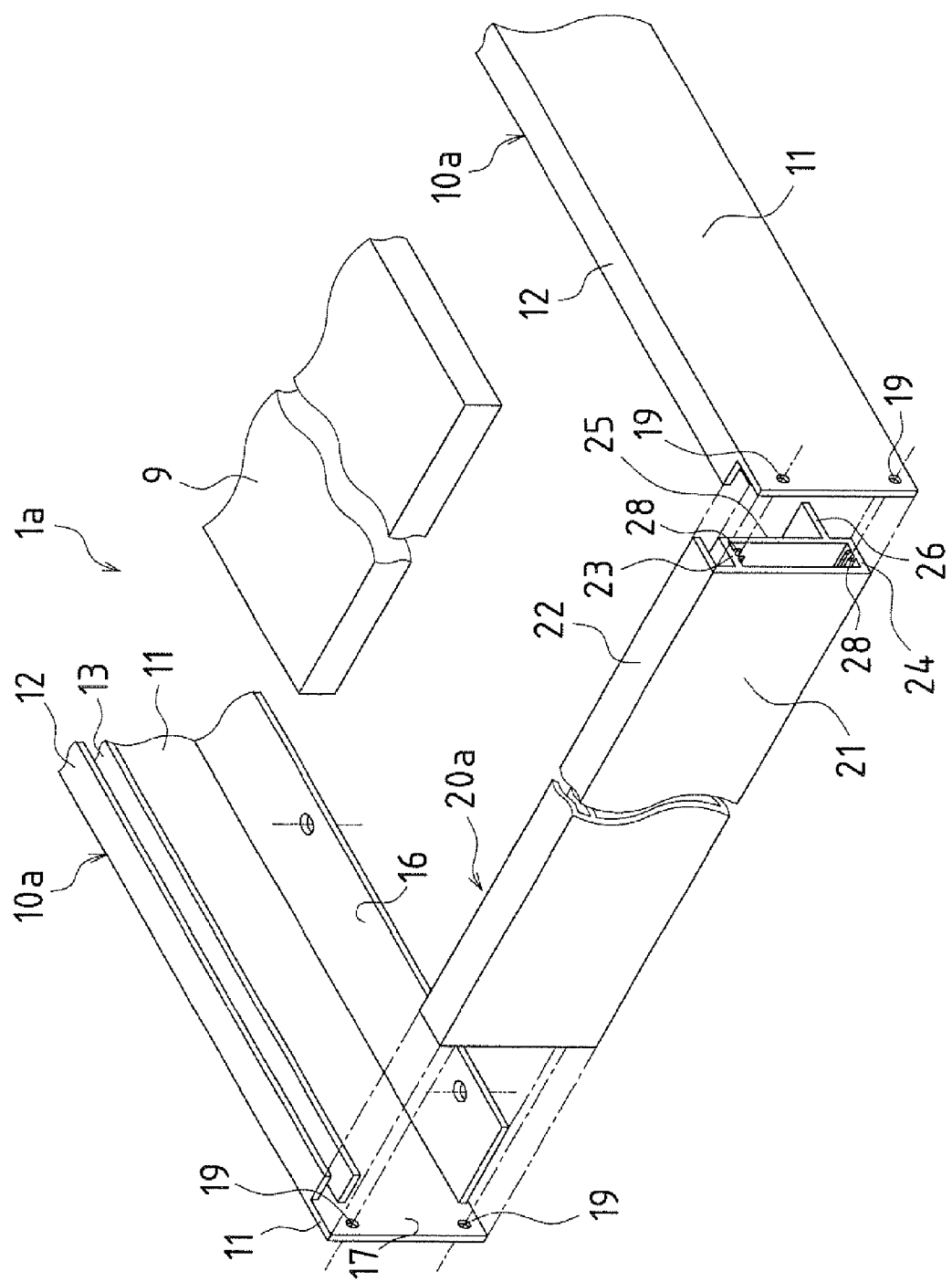
FIG. 1 is a partial exploded perspective view of a solar cell module according to Embodiment 1 of the present invention.

DESCRIPTION OF REFERENCE NUMERALS 1a solar cell module
1b solar cell module
1c solar cell module
1d solar cell module
1e solar cell module
2 solar cell module
3 solar cell module
4a solar cell module
5a solar cell module
9 solar cell panel
10a main frame member
10b main frame member
10c main frame member
10d main frame member
10e main frame member
11 main outer wall
12 main holding upper piece
13 main holding lower piece
16 main bottom piece
17 main outer wall edge portion inner side surface
18 reinforcement lump
19 screw hole
20a sub-frame member
20b sub-frame member
20c sub-frame member
20d sub-frame member
20e sub-frame member
21 sub-outer wall
22 sub-holding upper piece
23 sub-holding lower piece
24 sub-base piece
25 sub-inner wall
26 sub-bottom piece
28 screw receptacle
30 main frame member
31 main outer wall
32 main holding upper piece
33 main holding lower piece
34 main base piece
35 main inner wall
36 main bottom piece
37 main outer wall edge portion inner side surface
38 slit
39 screw hole
40 sub-frame member
41 sub-outer wall
42 sub-holding upper piece
43 sub-holding lower piece
44 sub-base piece
45 sub-inner wall
46 sub-bottom piece
47 sub-inner wall edge portion inner side surface
48 screw receptacle
50 main frame member
60 sub-frame member
70a sub-frame member
80a main frame member
81 screw hole disposition wall
90a sub-frame member
91 sub-base outer piece

BEST MODE FOR CARRYING OUT THE INVENTION

Next, solar cell modules according to embodiments of the present invention are described with reference to the drawings. In the description of these embodiments, solar cell modules according, to eight types of embodiments, namely Embodiments 1 to 8, are described.

<Embodiment 1>

Figure 2:
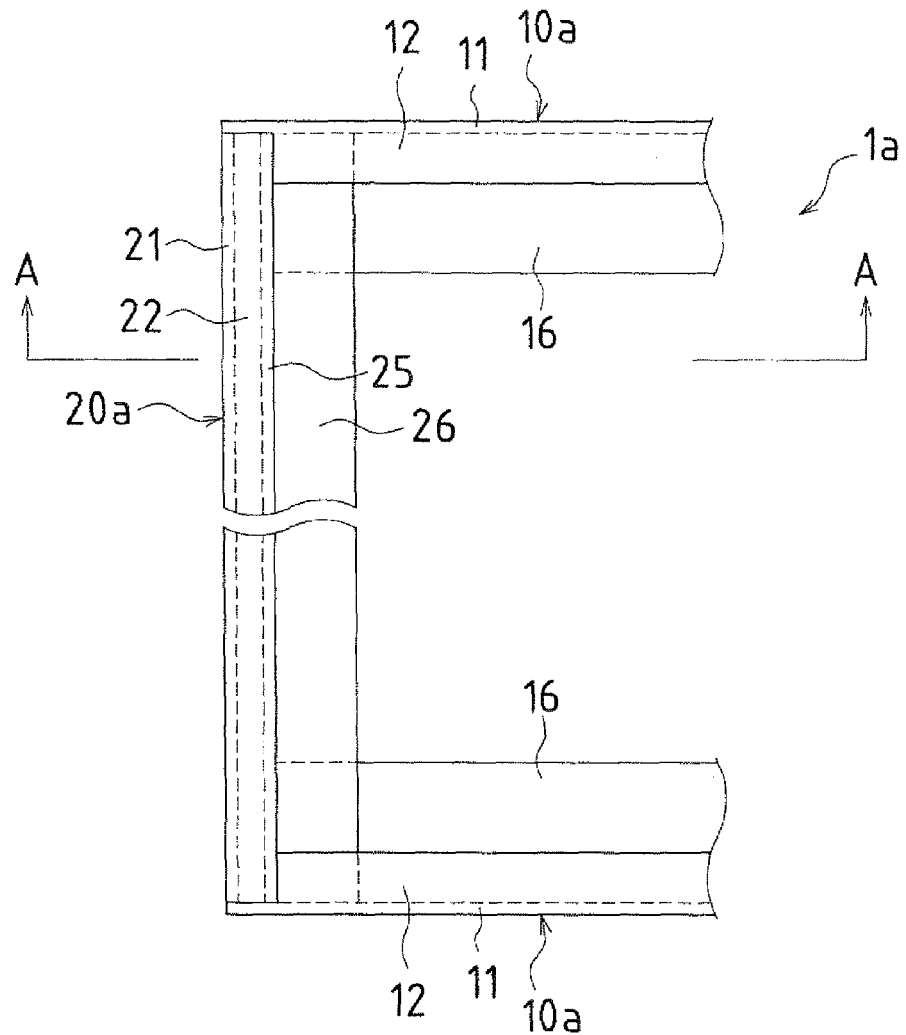
FIG. 2 is a partial plan view of the solar cell module according to Embodiment 1 of the present invention.
Figure 3:
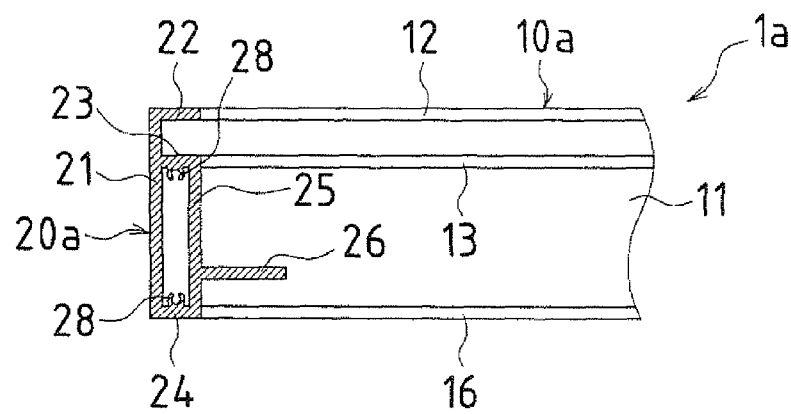
FIG. 3 is a cross-sectional view taken along A-A in FIG. 2.
Figure 4A:
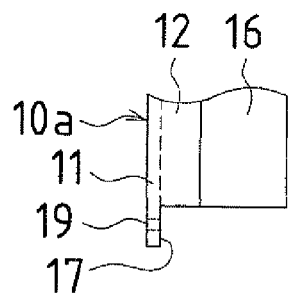
FIG. 4A is a partial plan view of an edge portion of a main frame member used for the solar cell module according to Embodiment 1 of the present invention.
Figure 4B:
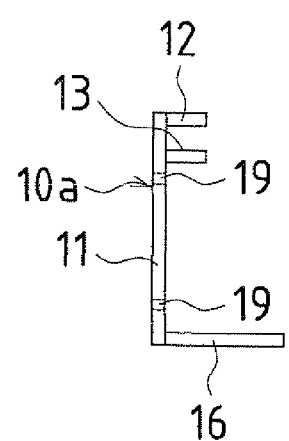
FIG. 4B is a front view of the edge portion of the main frame member used for the solar cell module according to Embodiment 1 of the present invention.
Figure 4C:
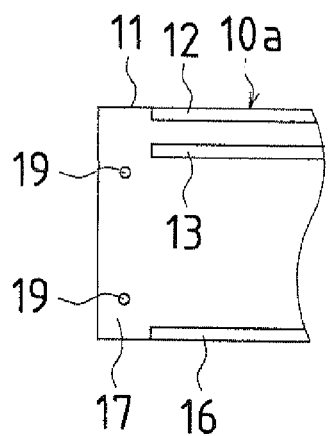
FIG. 4C is a partial side view of the edge portion of the main frame member used for the solar cell module according to Embodiment 1 of the present invention.
Figure 5A:
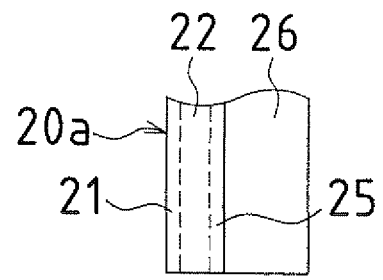
FIG. 5A is a partial plan view of an edge portion of a sub-frame member used for the solar cell module according to Embodiment 1 of the present invention.
Figure 5B:
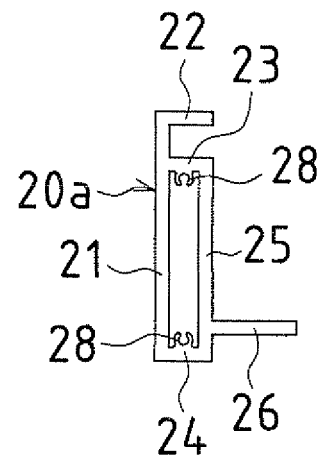
FIG. 5B is a front view of the edge portion of the sub-frame member used for the solar cell module according to Embodiment 1 of the present invention.
Figure 5C:
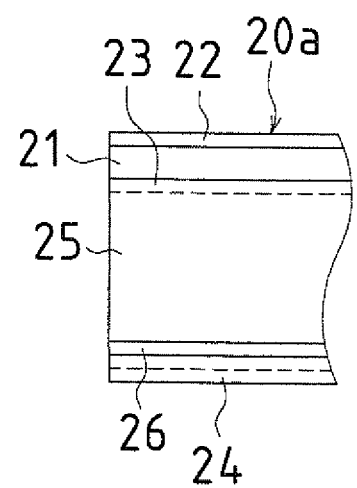
FIG. 5C is a partial side view of the edge portion of the sub-frame member used for the solar cell module according to Embodiment 1 of the present invention.

FIG. 1 is a partial exploded perspective view showing the structure of a solar cell module 1a according to Embodiment 1, FIG. 2 is a partial plan view thereof, and FIG. 3 is a cross-sectional view taken along A-A in FIG. 2. FIGS. 4A to 4C, and FIGS. 5A to 5C are drawings showing the shapes of edge portions of a main frame member 10a and a sub-frame member 20a that are used for this solar cell module 1a. FIGS. 4A and 5A are partial plan views, FIGS. 4B and 5B are front views, and FIGS. 4C and 5C are partial side views. Note that a solar cell panel 9 is omitted in FIGS. 2 and 3.

The solar cell module 1a according to Embodiment 1 has the following structure. That is, in FIGS. 1 to 5C, the solar cell panel 9 has a rectangular shape, and using two pairs of members, each pair constituted from the main frame member 10a that holds one side of this solar cell panel 9, and the sub-frame member 20a that holds an adjoining side that adjoins this one side, the solar cell panel 9 is held.

The above-mentioned main frame member 10a is constituted from a main outer wall 11, a main holding upper piece 12, a main holding lower piece 13, and a main bottom piece 16. Among these, the main outer wall 11 is perpendicularly formed along one side of the solar cell panel 9 that is in a horizontal state. The main holding upper piece 12 and the main holding lower piece 13 are provided projecting horizontally with substantially the same length, above and below, to the inner side of the upper part of the main outer wall 11, and hold the solar cell panel 9 fitted therebetween. The main bottom piece 16 is formed on the inner side of the lower edge of the main outer wall 11, along the main outer wall 11, projecting horizontally further than the main holding upper piece 12 and the main holding lower piece 13.

The above-mentioned sub-frame member 20a is constituted from a sub-outer wall 21, a sub-holding upper piece 22, a sub-holding lower piece 23, a sub-base piece 24, a sub-inner wall 25, and a sub-bottom piece 26. Among these, the sub-outer wall 21 is perpendicularly formed along an adjoining side that adjoins the above-mentioned one side of the solar cell panel 9. The sub-holding upper piece 22 and the sub-holding lower piece 23 are provided projecting horizontally with substantially the same length, above and below, to the inner side of the upper part of the sub-outer wall 21, and hold the solar cell panel 9 fitted therebetween. The sub-base piece 24 is formed projecting horizontally on the inner side of the lower edge of the sub-outer wall 21, along the sub-outer wall 21. The sub-inner wall 25 is formed parallel to the sub-outer wall 21 connecting the sub-base piece 24 and the sub-holding lower piece 23. The sub-bottom piece 26 is formed on the inner side of the lower part of the sub-inner wall 25, along the sub-inner wall 25, projecting horizontally further than the sub-holding upper piece 22 and the sub-holding lower piece 23.

That is, with the solar cell module 1a according to Embodiment 1, the main bottom piece 16 of the main frame member 10a is formed projecting on the inner side of the lower edge of the main outer wall 11, and using the main bottom piece 16, the solar cell module 1a is fixed when installed. Also, the sub-bottom piece 26 of the sub-frame member 20a is formed projecting on the inner side of the sub-inner wall 25 of the sub-frame member 20a, so as to be positioned above the main bottom piece 16 of the main frame member 10a.

Also, with the above-mentioned solar cell module 1a, by removing the main holding upper piece 12, the main holding lower piece 13, and the main bottom piece 16 in the edge portion of the main outer wall 11 of the main frame member 10a from the end edge of the main outer wall 11, only for the same width as the projecting length of the sub-holding upper piece 22, the sub-holding lower piece 23, and the sub-base piece 24 of the sub-frame member 20a, a flat main outer wall edge portion inner side surface 17 is formed on the inner side of the edge portion of the main outer wall. Then, the end surface of the edge portion of the sub-frame member 20a is abutted against the main outer wall edge portion inner side surface 17, and the main frame member 10a and the sub-frame member 20a are connected via screws using screw holes 19 and screw receptacles 28.

At this time, since the sub-bottom piece 26 of the sub-frame member 20a is formed projecting on the inner side of the sub-inner wall 25 of the sub-frame member 20a, so as to be positioned above the main bottom piece 16 of the main frame member 10a as described above, it is possible to connect the main bottom piece 16 of the main frame member 10a, and the sub-bottom piece 26 of the sub-frame member 20a so as not to collide with each other.

With the above-mentioned solar cell module 1a, as described above, the main bottom piece 16 of the main frame member 10a and the sub-bottom piece 26 of the sub-frame member 20a are formed so as not to collide with each other, such that the projecting position heights of the pieces are different, that is, such that the sub-bottom piece 26 of the sub-frame member 20a is positioned above the main bottom piece 16 of the main frame member 10a.

Accordingly, with the above-mentioned solar cell module 1a, if only the flat main outer wall edge portion inner side surface 17 is formed on the inner side of the edge portion of the main outer wall 11 by removing the main holding upper piece 12, the main holding lower piece 13, and the main bottom piece 16 in the edge portion of the main outer wall 11 of the main frame member 10a from the end edge of the main outer wall 12, only for the same width as the projecting length of the sub-holding upper piece 22, the sub-holding lower piece 23, and the sub-base piece 24 of the sub-frame member 20a, it is possible to connect the main frame member 10a and the sub-frame member 20a by abutting the end surface of the edge portion of the sub-frame member 20a against the main outer wall edge portion inner side surface 17. That is, if only the main outer wall edge portion inner side surface 17 is formed by cutting the edge portion of the main outer wall 11 of the main frame member 10a, it is possible to connect the main frame member 10a and the sub-frame member 20a.

With the above-mentioned solar cell module 1a, the main bottom piece 16 of the main frame member 10a is used for fixing the solar cell module 1a. Therefore, regarding the solar cell module 1a that is formed by abutting the edge portion of the sub-frame member 20a against the edge portion of the main frame member 10a so as to connect the main frame member 10a and the sub-frame member 20a, the solar cell module 1a can be constituted using a frame member with a bottom piece of the frame member projecting from the lower edge of the frame member toward the solar cell panel 9 side (inner side) that is used for fixing this solar cell module 1a (the main bottom piece 16 of the main frame member 10a) and, also, needing the edge portion of only the main frame member 10a to be cut, which is one of the main frame member 10a and the sub-frame member 20a.

<Embodiment 2>

Figure 6:
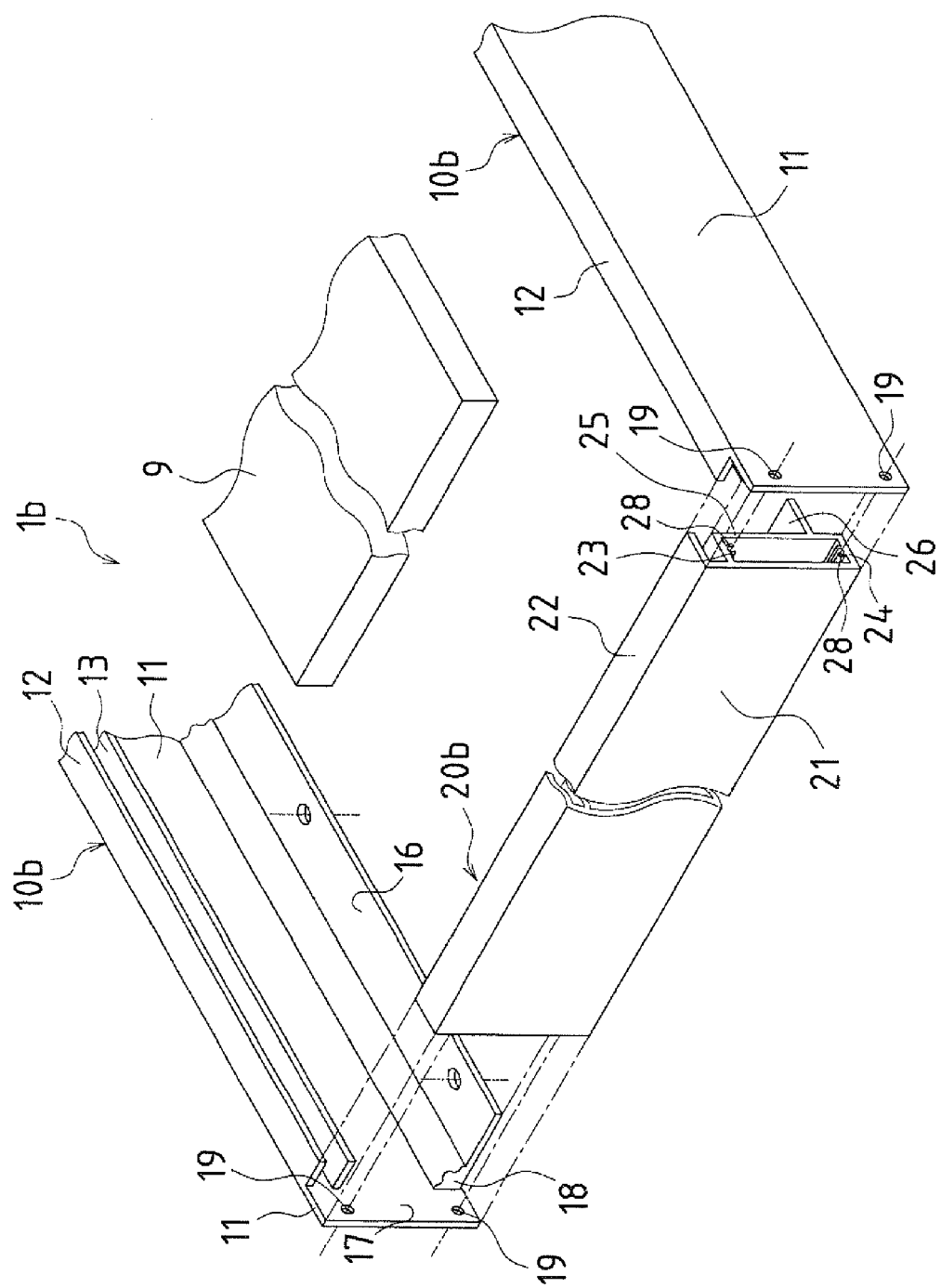
FIG. 6 is a partial exploded perspective view of a solar cell module according to Embodiment 2 of the present invention.
Figure 7:
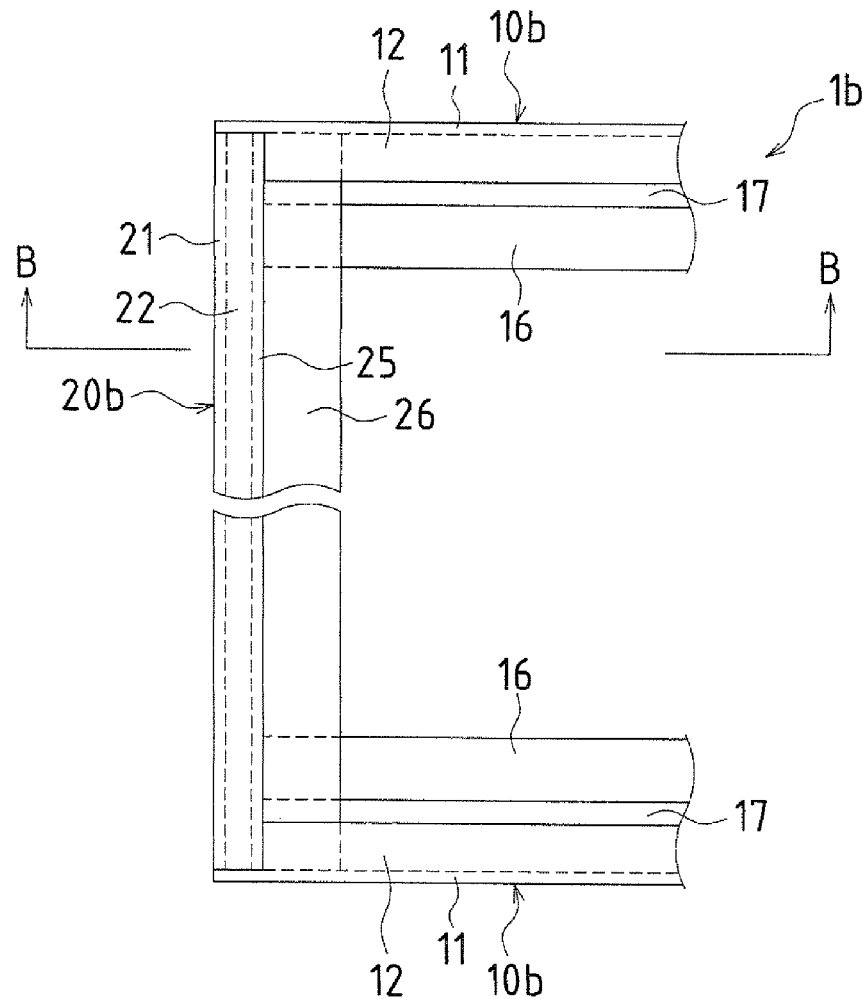
FIG. 7 is a partial plan view of the solar cell module according to Embodiment 2 of the present invention.
Figure 8:
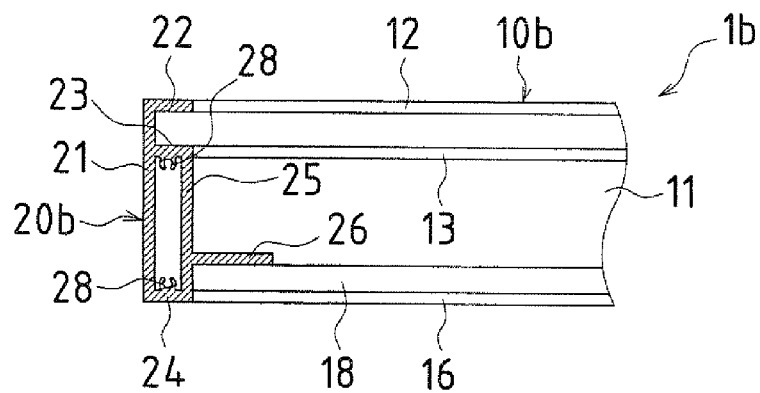
FIG. 8 is a cross-sectional view taken along B-B in FIG. 7.
Figure 9A:
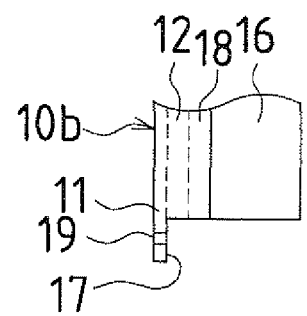
FIG. 9A is a partial plan view of an edge portion of a main frame member used for the solar cell module according to Embodiment 2 of the present invention.
Figure 9B:
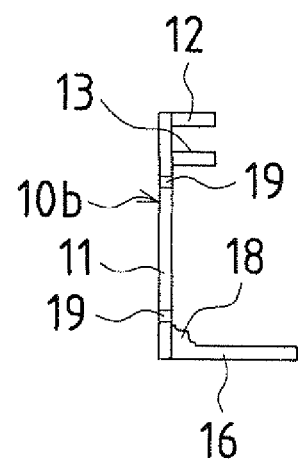
FIG. 9B is a front view of the edge portion of the main frame member used for the solar cell module according to Embodiment 2 of the present invention.
Figure 9C:
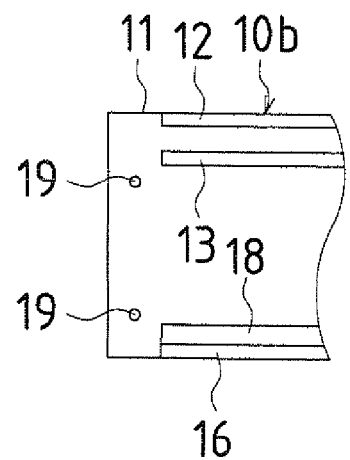
FIG. 9C is a partial side view of the edge portion of the main frame member used for the solar cell module according to Embodiment 2 of the present invention.
Figure 10A:
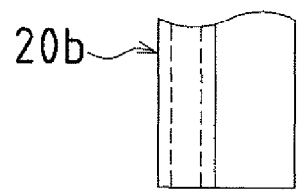
FIG. 10A is a partial plan view of an edge portion of a sub-frame member used for the solar cell module according to Embodiment 2 of the present invention.
Figure 10B:
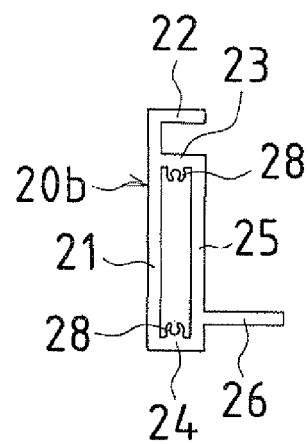
FIG. 10B is a front view of the edge portion of the sub-frame member used for the solar cell module according to Embodiment 2 of the present invention.
Figure 10C:
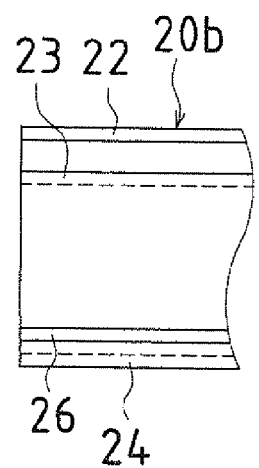
FIG. 10C is a partial side view of the edge portion of the sub-frame member used for the solar cell module according to Embodiment 2 of the present invention.

FIG. 6 is a partial exploded perspective view showing the structure of a solar cell module 1b according to Embodiment 2, FIG. 7 is a partial plan view thereof, and FIG. 8 is a cross-sectional view taken along B-B in FIG. 7. FIGS. 9A to 9C, and FIGS. 10A to 10C are drawings showing the shapes of edge portions of a main frame member 10b and a sub-frame member 20b that are used for this solar cell module 1b. FIGS. 9A and 10A are partial plan views, FIGS. 9B and 10B are front views, and FIGS. 9C and 10C are partial side views. Note that a solar cell panel 9 is omitted in FIGS. 7 and 8.

The solar cell module 1b according to Embodiment 2 is almost the same as the solar cell module 1a according to Embodiment 1, and the following points are modified from the solar cell module 1a according to Embodiment 1.

That is, in FIGS. 6 to 10C, a reinforcement lump 18 that is a protrusion for reinforcement is formed on the joint at which the main bottom piece 16 of the main frame member 10b projects from the lower edge of the main outer wall 11, and the sub-bottom piece 26 of the sub-frame member 20b is formed projecting on the inner side of the sub-inner wall 25 of the sub-frame member 20b so as to be positioned above the reinforcement lump 18 so that the sub-bottom piece 26 does not collide with this reinforcement lump 18 for reinforcement.

Therefore, in addition to the effect provided to the solar cell module 1a according to Embodiment 1, since the reinforcement lump 18 for reinforcement is formed on the joint at which the main bottom piece 16 of the main frame member 10b projects from the lower edge of the main outer wall 11, the strength of the main frame member 10b can be increased. Further, since the sub-bottom piece 26 of the sub-frame member 20b is formed projecting on the inner side of the sub-inner wall so as to be positioned above the reinforcement lump 18 for reinforcement, it is possible to avoid the sub-bottom piece of the sub-frame member colliding with the protrusion for reinforcement.

<Embodiment 3>

Figure 11:
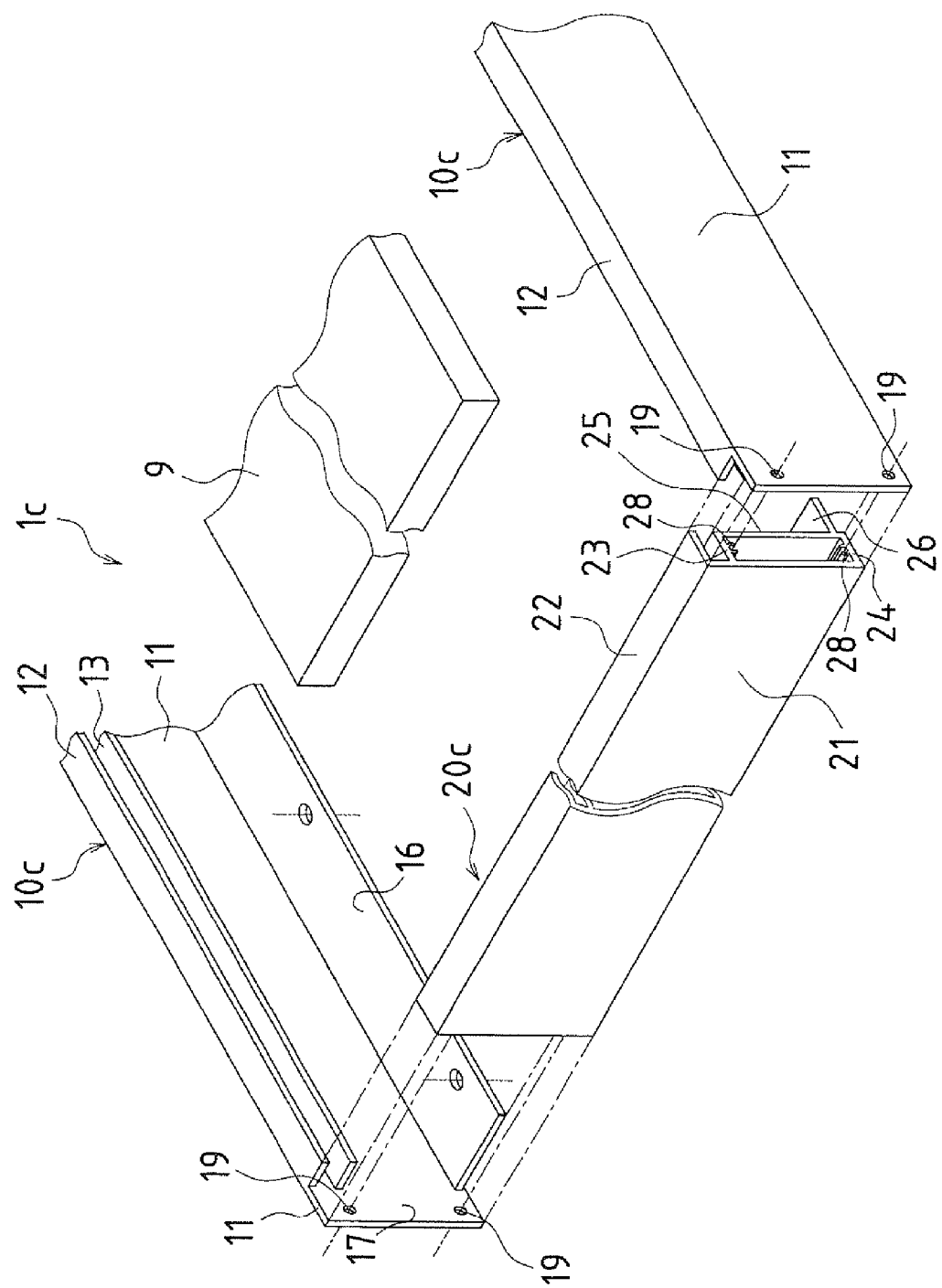
FIG. 11 is a partial exploded perspective view of a solar cell module according to Embodiment 3 of the present invention.
Figure 12:
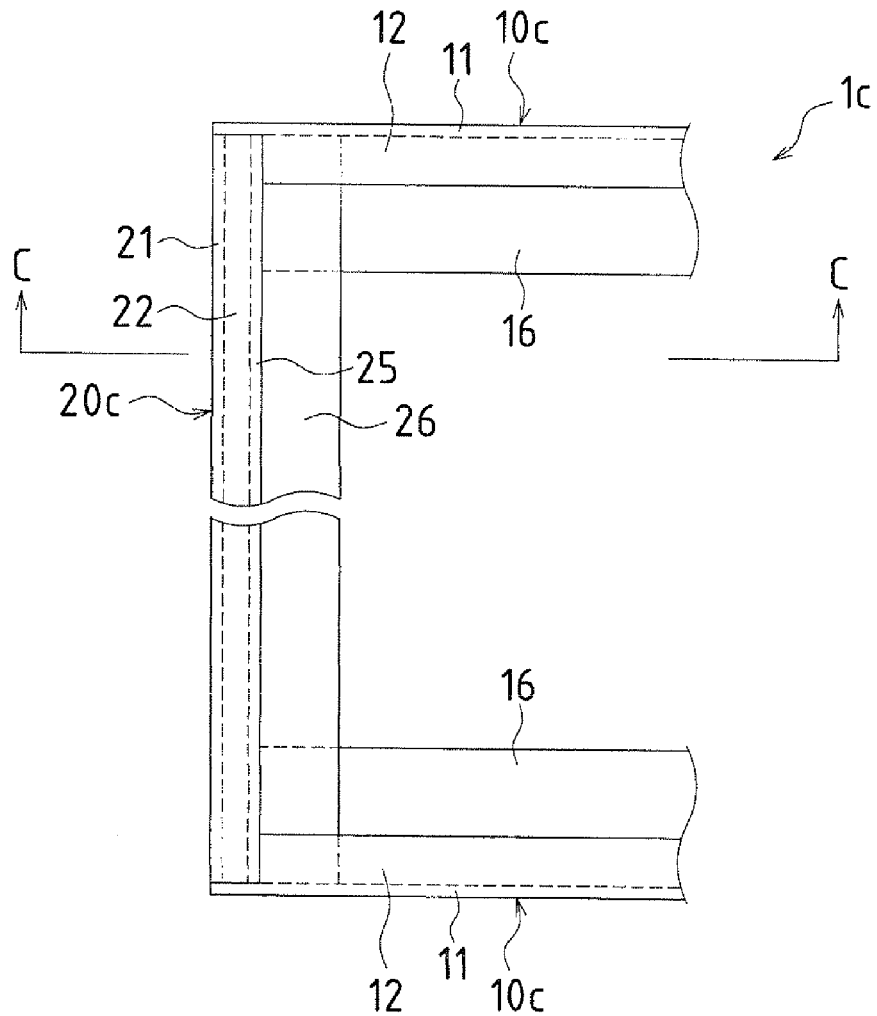
FIG. 12 is a partial plan view of the solar cell module according to Embodiment 3 of the present invention.
Figure 13:
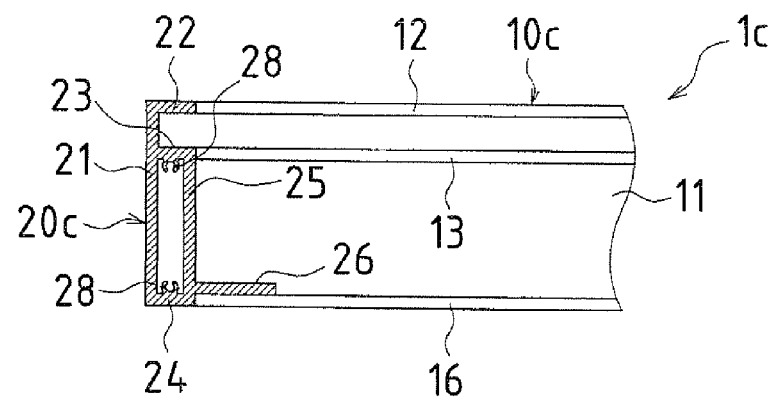
FIG. 13 is a cross-sectional view taken along C-C in FIG. 12.
Figure 14A:
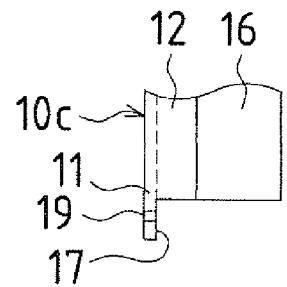
FIG. 14A is a partial plan view of an edge portion of a main frame member used for the solar cell module according to Embodiment 3 of the present invention.
Figure 14B:
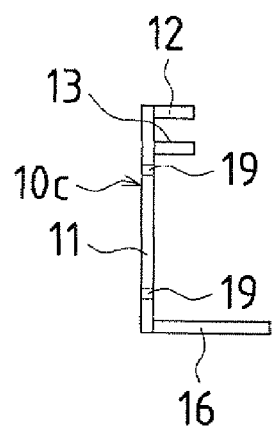
FIG. 14B is a partial plan view of the edge portion of the main frame member used for the solar cell module according to Embodiment 3 of the present invention.
Figure 14C:
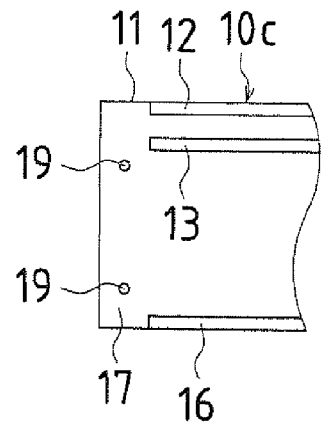
FIG. 14C is a partial side view of the edge portion of the main frame member used for the solar cell module according to Embodiment 3 of the present invention.
Figure 15A:
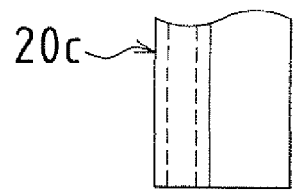
FIG. 15A is a partial plan view of an edge portion of a sub-frame member used for the solar cell module according to Embodiment 3 of the present invention.
Figure 15B:
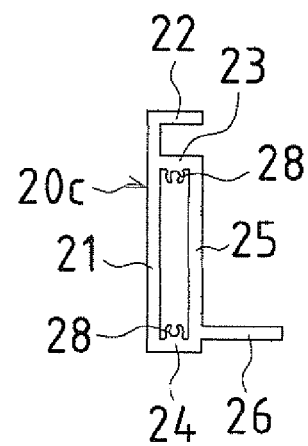
FIG. 15B is a front view of the edge portion of the sub-frame member used for the solar cell module according to Embodiment 3 of the present invention.
Figure 15C:
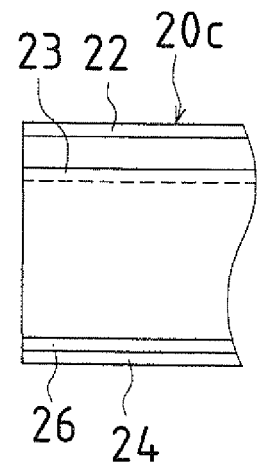
FIG. 15C is a partial side view of the edge portion of the sub-frame member used for the solar cell module according to Embodiment 3 of the present invention.

FIG. 11 is a partial exploded perspective view showing the structure of a solar cell module 1c according to Embodiment 2, FIG. 12 is a partial plan view thereof, and FIG. 13 is a cross-sectional view taken along C-C in FIG. 12. FIGS. 14A to 14C, and FIGS. 15A to 15C are drawings showing the shapes of edge portions of a main frame member 10c and a sub-frame member 20c that are used for this solar cell module 1c. FIGS. 14A and 15A are partial plan views, FIGS. 14B and 15B are front views, and FIGS. 14C and 15C are partial side views. Note that a solar cell panel 9 is omitted in FIGS. 12 and 13.

The solar cell module 1c according to Embodiment 3 is almost the same as the solar cell module 1a according to Embodiment 1. That is, in FIGS. 11 to 15C, the main bottom piece 16 of the main frame member 10c is formed projecting on the inner side of the lower edge of the main outer wall 11, and using the main bottom piece 16, the solar cell module 1c is fixed when installed. Also, the sub-bottom piece 26 of the sub-frame member 20c is formed projecting on the inner side of the sub-inner wall 25 of the sub-frame member 20c so as to be positioned above the main bottom piece 16 of the main frame member 10c, which is similar to the solar cell module 1a according to Embodiment 1.

Furthermore, with the solar cell module 1c according to Embodiment 3, the following point is modified from the solar cell module 1a according to Embodiment 1. That is, the sub-bottom piece 26 of the sub-frame member 20c is formed such that the lower surface near the side end of the sub-bottom piece 26 abuts against the upper surface near the side end of the main bottom piece 16 of the main frame member 10c.

Therefore, in addition to the effect provided to the solar cell module 1a according to Embodiment 1, of gravity of the above-mentioned solar cell module 1c, gravity on the sub-frame member 20c can be transferred to the main bottom piece 16 of the main frame member 10c that is formed at the lower edge of the main outer wall 11 of the main frame member 10c, and that is used for fixing the solar cell module 1c when installed. Accordingly, the above-mentioned solar cell module 1c can be stably installed.

<Embodiment 4>

Figure 16:
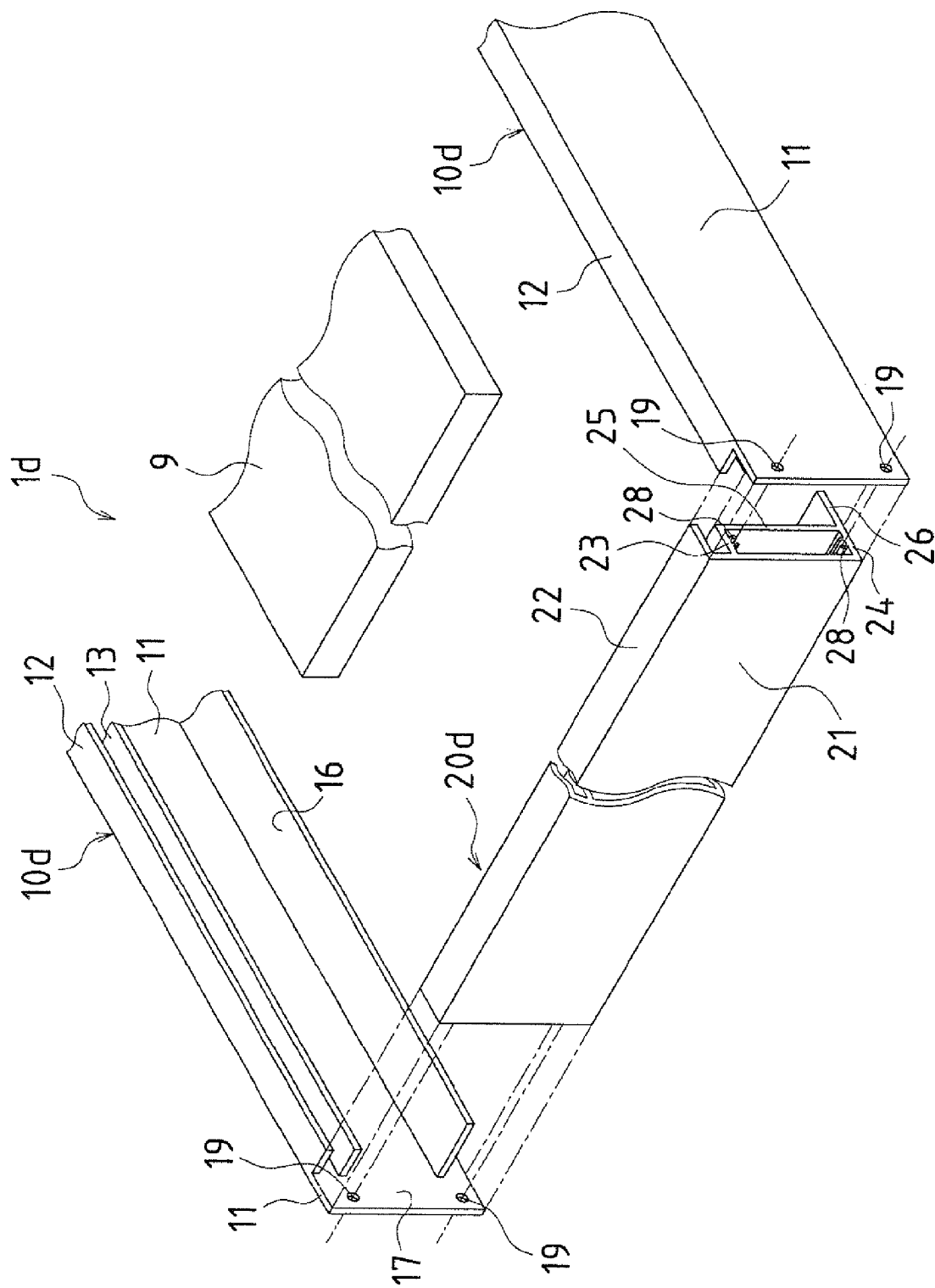
FIG. 16 is a partial exploded perspective view of a solar cell module according to Embodiment 4 of the present invention.
Figure 17:
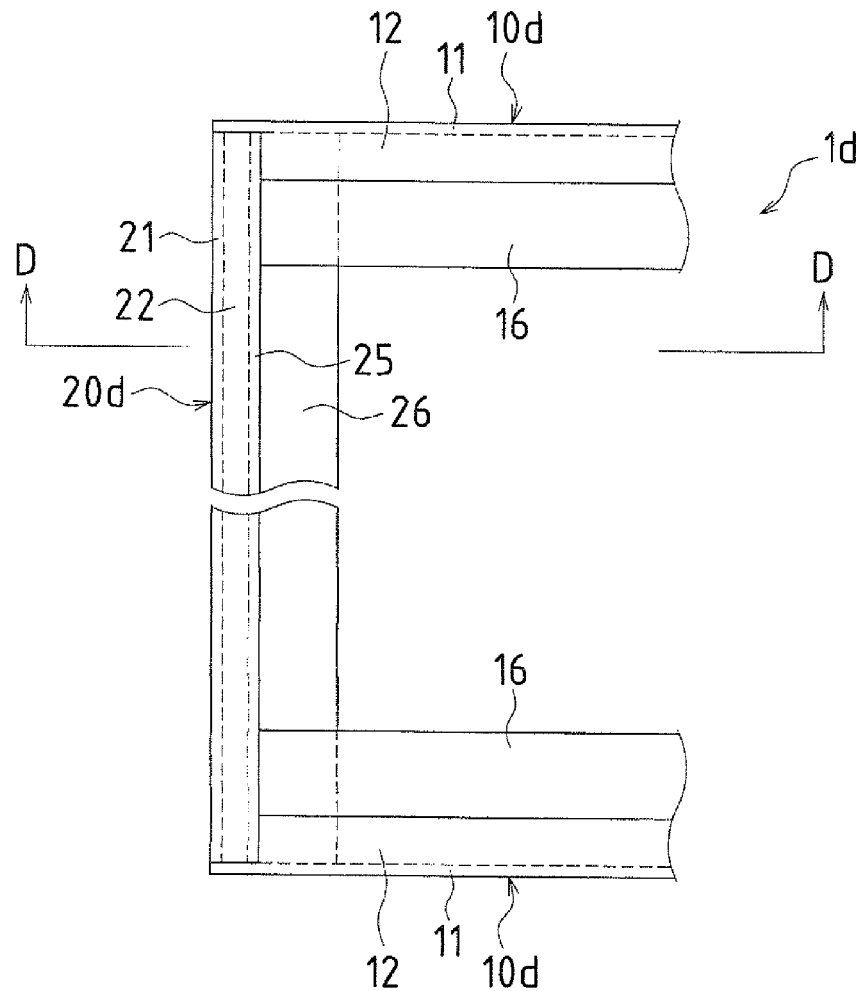
FIG. 17 is a partial plan view of the solar cell module according to Embodiment 4 of the present invention.
Figure 18:
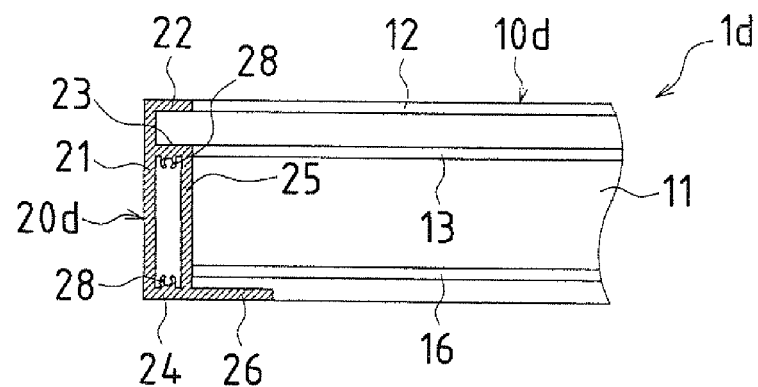
FIG. 18 is a cross-sectional view taken along D-D in FIG. 17.
Figure 19A:
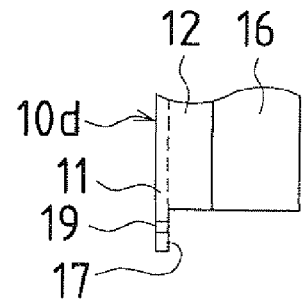
FIG. 19A is a partial plan view of an edge portion of a main frame member used for the solar cell module according to Embodiment 4 of the present invention.
Figure 19B:
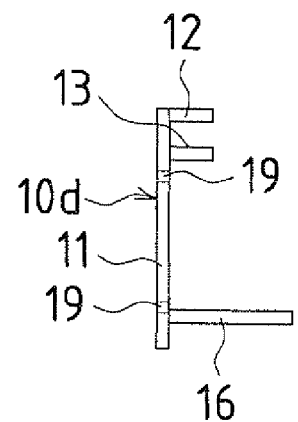
FIG. 19B is a front view of the edge portion of the main frame member used for the solar cell module according to Embodiment 4 of the present invention.
Figure 19C:
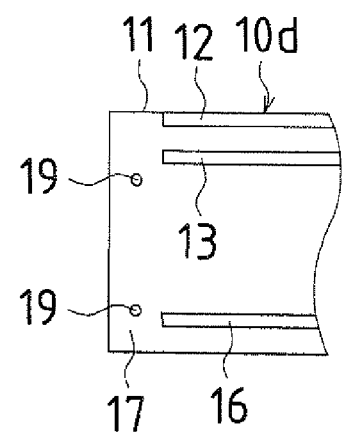
FIG. 19C is a partial side view of the edge portion of the main frame member used for the solar cell module according to Embodiment 4 of the present invention.
Figure 20A:
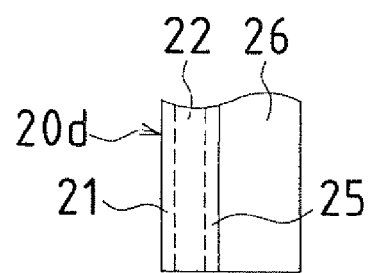
FIG. 20A is a partial plan view of an edge portion of a sub-frame member used for the solar cell module according to Embodiment 4 of the present invention.
Figure 20B:
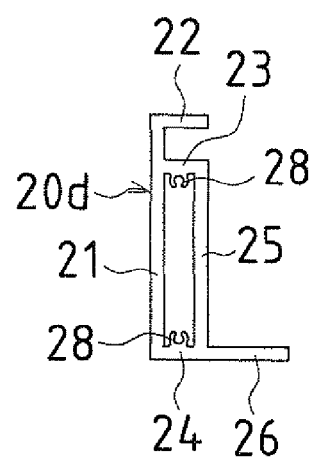
FIG. 20B is a front view of the edge portion of the sub-frame member used for the solar cell module according to Embodiment 4 of the present invention.
Figure 20C:
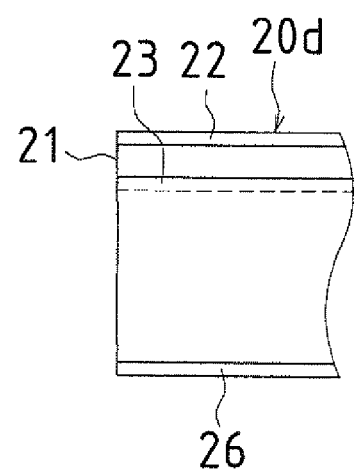
FIG. 20C is a partial side view of the edge portion of the sub-frame member used for the solar cell module according to Embodiment 4 of the present invention.

FIG. 16 is a partial exploded perspective view showing the structure of a solar cell module 1d according to Embodiment 4, FIG. 17 is a partial plan view thereof, FIG. 18 is a cross-sectional view taken along D-D in FIG. 17. FIGS. 19A to 19C, and FIGS. 20A to 20C are drawings showing the shapes of edge portions of a main frame member 10d and a sub-frame member 20d that are used for this solar cell module 1d. FIGS. 19A and 20A are partial plan views, FIGS. 19B and 20B are front views, and FIGS. 19C and 20C are partial side views. Note that a solar cell panel 9 is omitted in FIGS. 17 and 18.

The solar cell module 1d according to Embodiment 4 is almost the same as the solar cell module 1a according to Embodiment 1, and the following point is modified from the solar cell module 1a according to Embodiment 1.

That is, in FIGS. 16 to 20C, the solar cell module 1d according to Embodiment 4 is constituted such that the roles of the main frame member 10d and the sub-frame member 20d are the opposites of the roles of the main frame member 10a and the sub-frame member 20a of the solar cell module 1a according to Embodiment 1.

That is, the sub-bottom piece 26 of the sub-frame member 20d is formed projecting on the inner side of the lower edge of the sub-inner wall 25 of the sub-frame member 20d, and using the sub-bottom piece 26, the solar cell module 1d is fixed when installed. The main bottom piece 16 of the main frame member 10d is formed projecting on the inner side of the main outer wall 11 of the main frame member 10d so as to be positioned above the sub-bottom piece 26 of the sub-frame member 20d.

Therefore, the function and effect provided to the solar cell module 1d according to Embodiment 4 are the same as the function and effect provided to the solar cell module 1a according to Embodiment 1.

<Embodiment 5>

Figure 21:
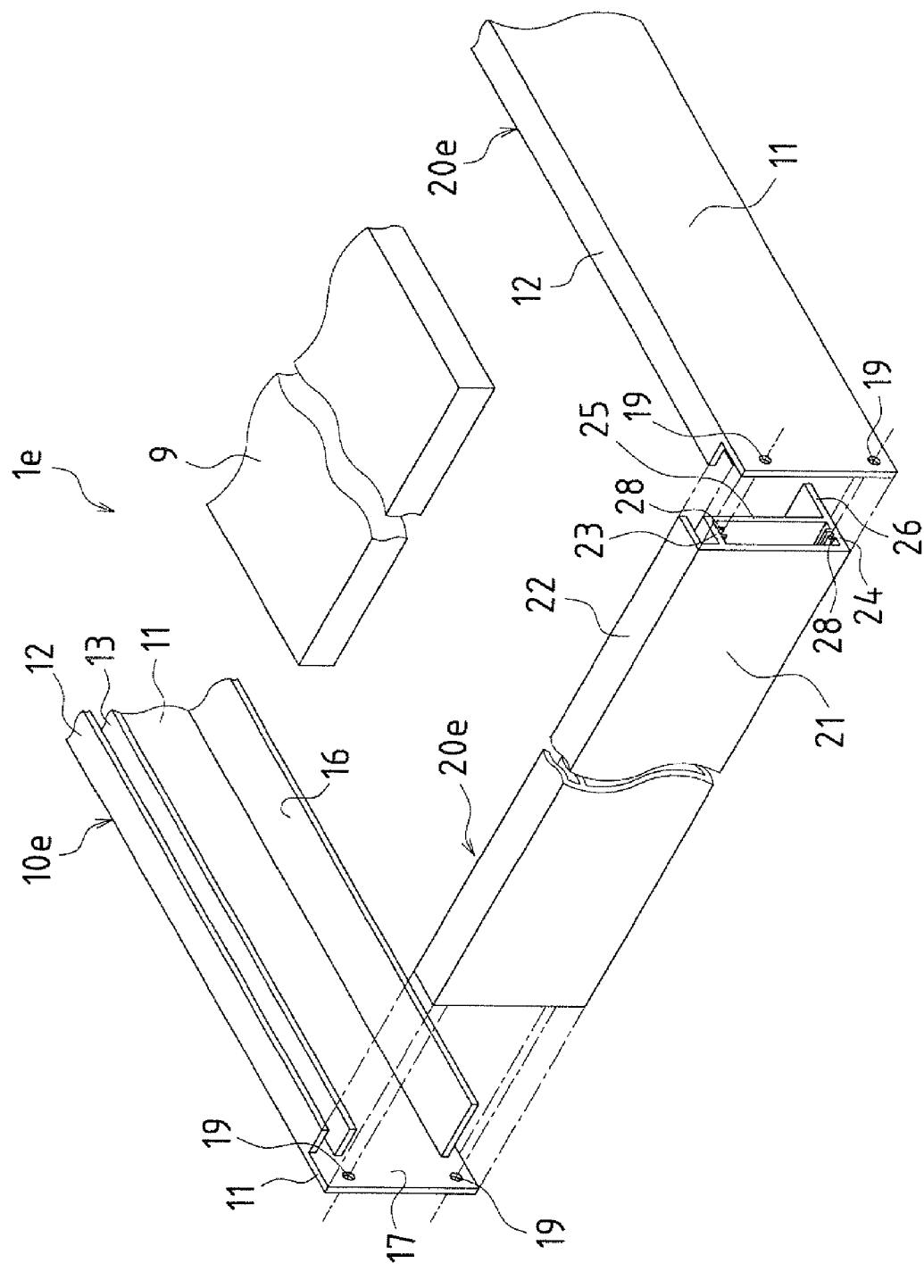
FIG. 21 is a partial exploded perspective view of a solar cell module according to Embodiment 5 of the present invention.
Figure 22:
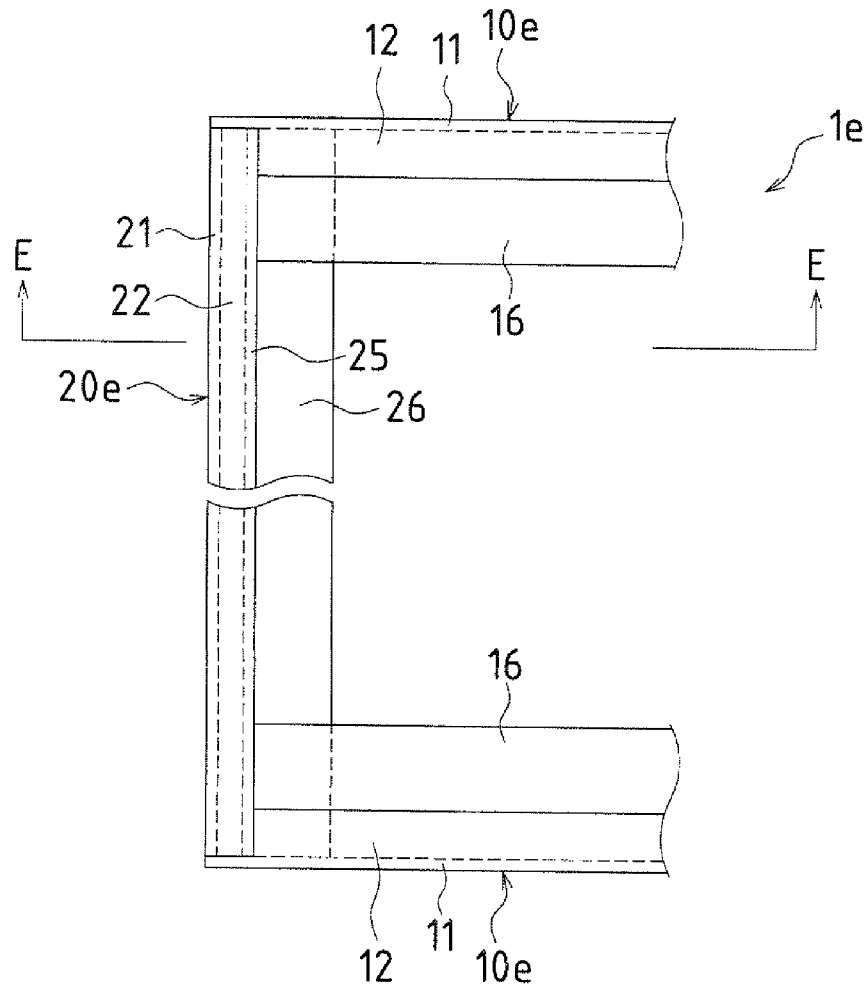
FIG. 22 is a partial plan view of the solar cell module according to Embodiment 5 of the present invention.
Figure 23:
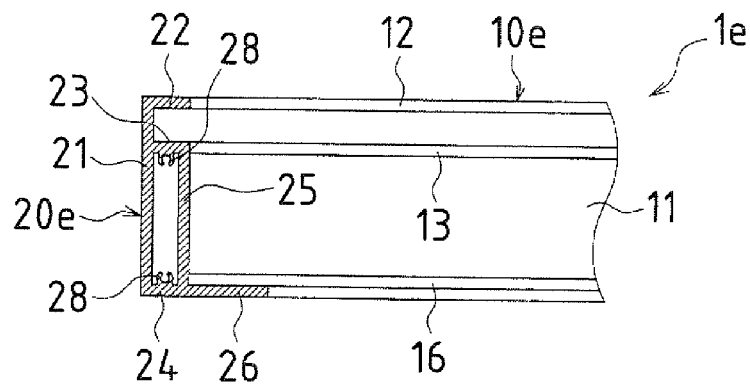
FIG. 23 is a cross-sectional view taken along E-E in FIG. 22.
Figure 24A:
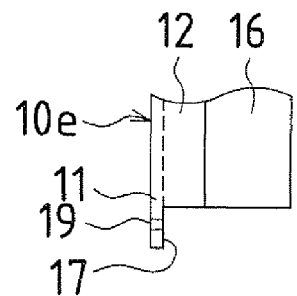
FIG. 24A is a partial plan view of an edge portion of a main frame member used for the solar cell module according to Embodiment 5 of the present invention.
Figure 24B:
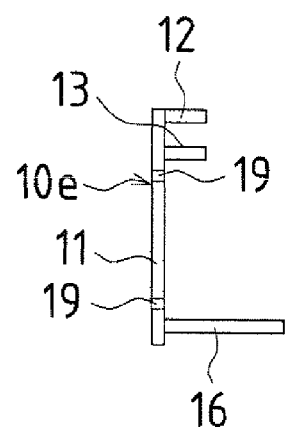
FIG. 24B is a front view of the edge portion of the main frame member used for the solar cell module according to Embodiment 5 of the present invention.
Figure 24C:
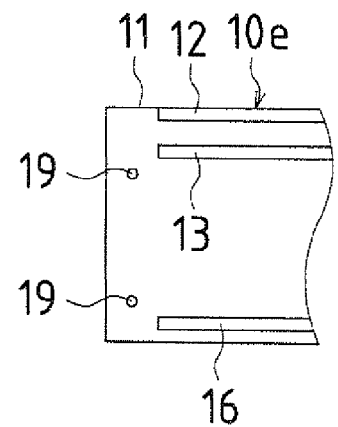
FIG. 24C is a partial side view of the edge portion of the main frame member used for the solar cell module according to Embodiment 5 of the present invention.
Figure 25A:
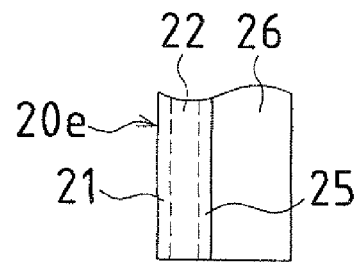
FIG. 25A is a partial plan view of an edge portion of a sub-frame member used for the solar cell module according to Embodiment 5 of the present invention.
Figure 25B:
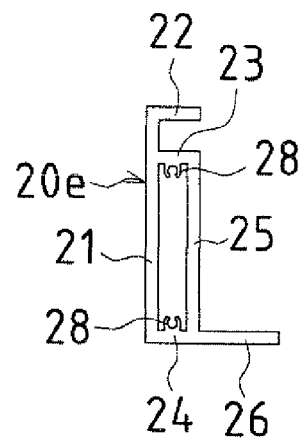
FIG. 25B is a front view of the edge portion of the sub-frame member used for the solar cell module according to Embodiment 5 of the present invention.
Figure 25C:
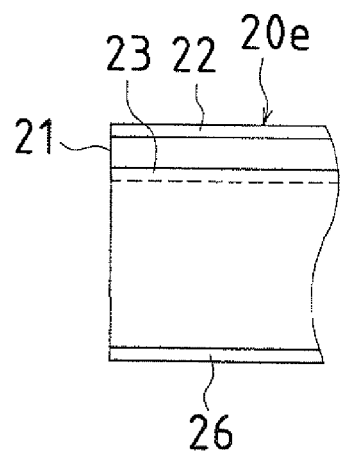
FIG. 25C is a partial side view of the edge portion of the sub-frame member used for the solar cell module according to Embodiment 5 of the present invention.

FIG. 21 is a partial exploded perspective view showing the structure of a solar cell module 1e according to Embodiment 5, FIG. 22 is a partial plan view thereof, and FIG. 23 is a cross-sectional view taken along E-E in FIG. 22. FIGS. 24A to 24C, and FIGS. 25A to 25C are drawings showing the shapes of edge portions of a main frame member 10e and a sub-frame member 20e that are used for this solar cell module 1e. FIGS. 24A and 25A are partial plan views, FIGS. 24B and 25B are front views, and FIGS. 24C and 25C are partial side views. Note that a solar cell panel 9 is omitted in FIGS. 22 and 23.

The solar cell module 1e according to Embodiment 5 is almost the same as the solar cell module 1d according to Embodiment 4. That is, in FIGS. 21 to 25C, the sub-bottom piece 26 of the sub-frame member 20e is formed projecting on the inner side of the lower edge of the sub-inner wall 25 of the sub-frame member 20e, and using the sub-bottom piece 26, the solar cell module 1e is fixed when installed. Further, the main bottom piece 16 of the main frame member 10e is formed projecting on the inner side of the main outer wall 11 of the main frame member 10e so as to be positioned above the sub-bottom piece 26 of the sub-frame member 20e, which is similar to the solar cell module 1d according to Embodiment 4.

Furthermore, with the solar cell module 1e according to Embodiment 5, the following point is modified from the solar cell module 1d according to Embodiment 4. That is, the sub-bottom piece 26 of the sub-frame member 20e is formed such that the upper surface near the side end of the sub-bottom piece 26 abuts against the lower surface near the side end of the main bottom piece 16 of the main frame member 10e.

Therefore, in addition to the effect provided to the solar cell module 1d according to Embodiment 4, of gravity of the above-mentioned solar cell module 1e, gravity on the sub-frame member 20e can be transferred to the main bottom piece 16 of the main frame member 10e that is formed at the lower edge of the main outer wall 11 of the main frame member 10e, and that is used for fixing the solar cell module 1e when installed. Accordingly, the above-mentioned solar cell module 1e can be stably installed.

<Embodiment 6>

Figure 26:
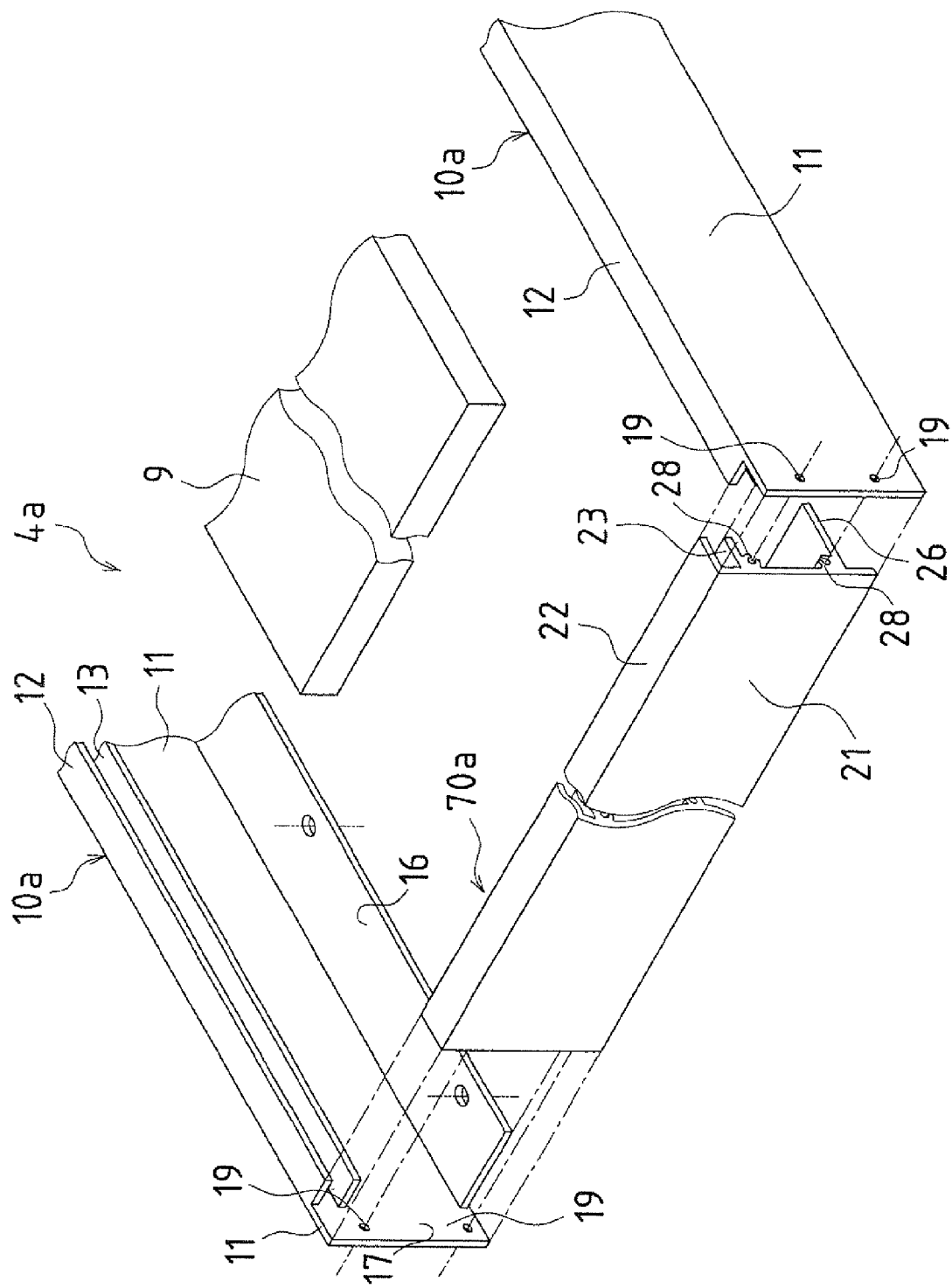
FIG. 26 is a partial exploded perspective view of a solar cell module according to Embodiment 6.
Figure 27:
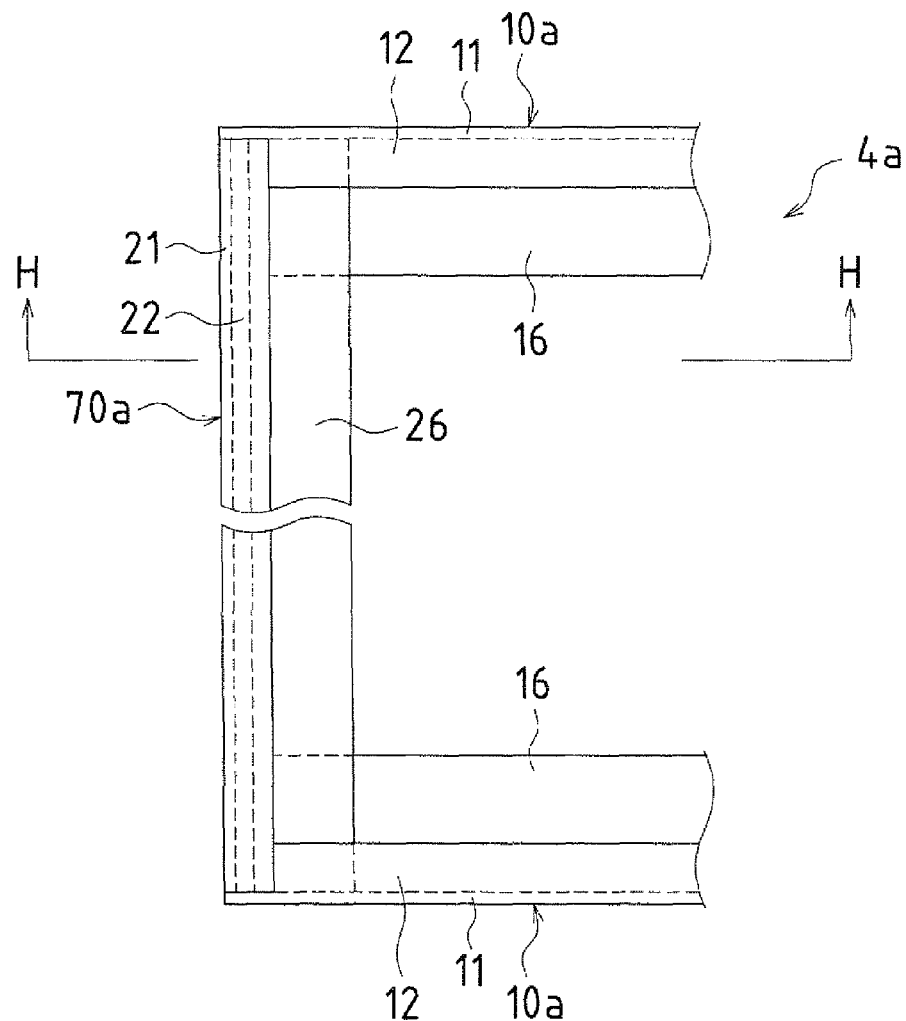
FIG. 27 is a partial plan view of the solar cell module according to Embodiment 6.
Figure 28:
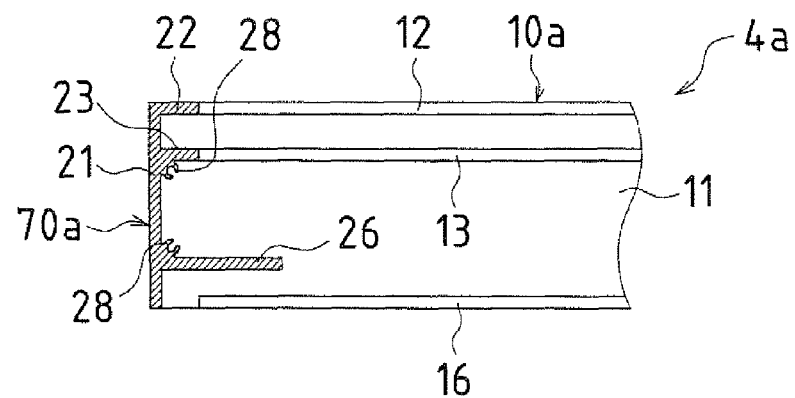
FIG. 28 is a cross-sectional view taken along H-H in FIG. 27.
Figure 29A:
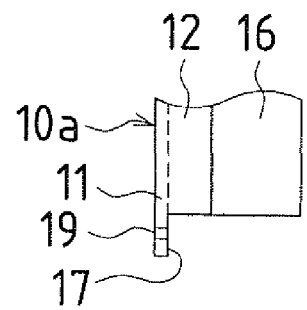
FIG. 29A is a partial plan view of an edge portion of a main frame member used for the solar cell module according to Embodiment 6 of the present invention.
Figure 29B:
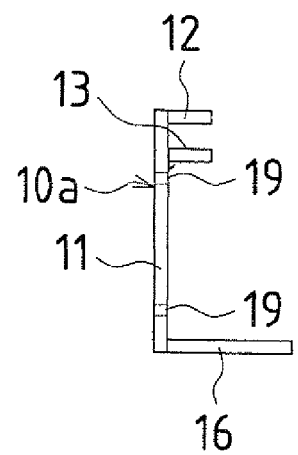
FIG. 29B is a front view of the edge portion of the main frame member used for the solar cell module according to Embodiment 6 of the present invention.
Figure 29C:
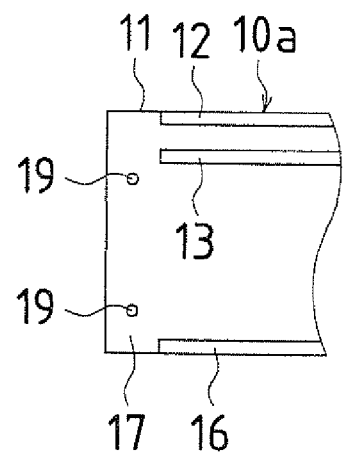
FIG. 29C is a partial side view of the edge portion of the main frame member used for the solar cell module according to Embodiment 6 of the present invention.
Figure 30A:
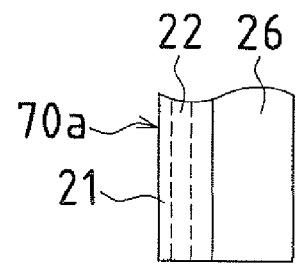
FIG. 30A is a partial plan view of an edge portion of a sub-frame member used for the solar cell module according to Embodiment 6 of the present invention.
Figure 30B:
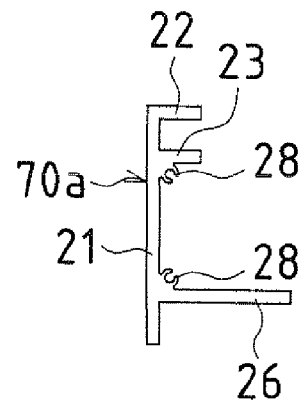
FIG. 30B is a front view of the edge portion of the sub-frame member used for the solar cell module according to Embodiment 6 of the present invention.
Figure 30C:
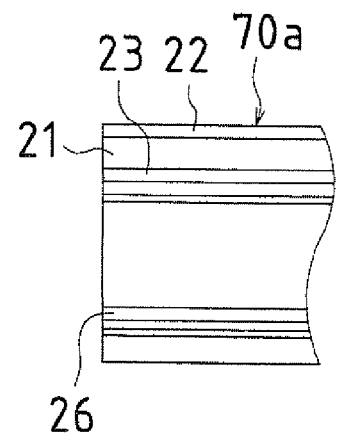
FIG. 30C is a partial side view of the edge portion of the sub-frame member used for the solar cell module according to Embodiment 6 of the present invention.

FIG. 26 is a partial exploded perspective view showing the structure of a solar cell module 4a according to Embodiment 6, FIG. 27 is a partial plan view thereof, and FIG. 28 is a cross-sectional view taken along H-H in FIG. 27. FIGS. 29A to 29C, and FIGS. 30A to 30C are drawings showing the shapes of edge portions of a main frame member 10a and a sub-frame member 70a that are used for this solar cell module 4a. FIGS. 29A and 30A are partial plan views, FIGS. 29B and 30B are front views, and FIGS. 29C and 30C are partial side views. Note that a solar cell panel 9 is omitted in FIGS. 27 and 28.

The solar cell module 4a according to Embodiment 6 has the following structure. That is, in FIG. 26 to FIG. 30C, the solar cell panel 9 has a rectangular shape, and using two pairs of members, each pair constituted from the main frame member 10a that holds one side of this solar cell panel 9 and the sub-frame member 70a that holds an adjoining side that adjoins this one side, the solar cell panel 9 is held.

Similar to the solar cell module 1a according to Embodiment 1, the above-mentioned main frame member 10a is constituted from a main outer wall 11, a main holding upper piece 12, a main holding lower piece 13, and a main bottom piece 16. Among these, the main outer wall 11 is formed along one side of the solar cell panel 9. The main holding upper piece 12 and the main holding lower piece 13 are provided projecting horizontally with substantially the same length, above and below, to the inner side of the upper part of the main outer wall 11, and hold the solar cell panel 9 fitted therebetween. The main bottom piece 16 is formed on the inner side of the lower edge of the main outer wall 11, along the main outer wall 11, projecting horizontally further than the main holding upper piece 12 and the main holding lower piece 13.

Differing from the solar cell module 1a according to Embodiment 1, the above-mentioned sub-frame member 70a is constituted from the sub-outer wall 21, the sub-holding upper piece 22, the sub-holding lower piece 23, and the sub-bottom piece 26. Among these, the sub-outer wall 21 is perpendicularly formed along an adjoining side that adjoins the above-mentioned one side of the solar cell panel 9. The sub-holding upper piece 22 and the sub-holding lower piece 23 are provided projecting horizontally with substantially the same length, above and below, to the inner side of the upper part of the sub-outer wall 21, and hold the solar cell panel 9 fitted therebetween. The sub-bottom piece 26 is formed on the inner side of the lower part of the sub-outer wall 21, along the sub-outer wall 21, projecting horizontally further than the sub-holding upper piece 22 and the sub-holding lower piece 23.

That is, with the solar cell module 4a according to Embodiment 6, the main bottom piece 16 of the main frame member 10a is formed projecting on the inner side of the lower edge of the main outer wall 11, and using the main bottom piece 16, the solar cell module 4a is fixed when installed. Further, the sub-bottom piece 26 of the sub-frame member 70a is formed projecting on the inner side of the sub-outer wall 21 of the sub-frame member 70a so as to be positioned above the main bottom piece 16 of the main frame member 10a.

With the above-mentioned solar cell module 4a, by removing the main holding upper piece 12, the main holding lower piece 13, and the main bottom piece 16 in the edge portion of the main outer wall 11 of the main frame member 10a from the end edge of the main outer wall 11, only for the same width as the projecting length of the sub-holding upper piece 22 and the sub-holding lower piece 23 of the sub-frame member 70a, a flat main outer wall edge portion inner side surface 17 is formed on the inner side of the edge portion of the main outer wall 11. Then, the end surface of the edge portion of the sub-frame member 70a is abutted against the main outer wall edge portion inner side surface 17, and the main frame member 10a and the sub-frame member 70a are connected via screws using screw holes 19 and screw receptacles 28.

At this time, since the sub-bottom piece 26 of the sub-frame member 70a is formed projecting on the inner side of the sub-outer wall 21 of the sub-frame member 70a, so as to be positioned above the main bottom piece 16 of the main frame member 10a as described above, it is possible to connect the main bottom piece 16 of the main frame member 10a and the sub-bottom piece 26 of the sub-frame member 70a so as not to collide with each other.

With the above-mentioned solar cell module 4a, as described above, the main bottom piece 16 of the main frame member 10a and the sub-bottom piece 26 of the sub-frame member 70a are formed so as not to collide with each other, such that the projecting position heights of the pieces are different, that is, such that the sub-bottom piece 26 of the sub-frame member 70a is positioned above the main bottom piece 16 of the main frame member 10a.

Accordingly, with the above-mentioned solar cell module 4a, if only the flat main outer wall edge portion inner side surface 17 is formed on the inner side of the edge portion of the main outer wall 11 by removing the main holding upper piece 12, the main holding lower piece 13, and the main bottom piece 16 in the edge portion of the main outer wall 11 of the main frame member 10a from the end edge of the main outer wall 12, for the same width as the projecting length of the sub-holding upper piece 22 and the sub-holding lower piece 23 of the sub-frame member 70a, it is possible to connect the main frame member 10a and the sub-frame member 70a by abutting the end surface of the edge portion of the sub-frame member 70a against the main outer wall edge portion inner side surface 17. That is, if only the main outer wall edge portion inner side surface 17 is formed by cutting the edge portion of the main outer wall 11 of the main frame member 10a, it is possible to connect the main frame member 10a and the sub-frame member 70a.

With the above-mentioned solar cell module 4a, the main bottom piece 16 of the main frame member 10a is used for fixing the solar cell module 4a. Therefore, regarding the solar cell module 4a that is formed by abutting the edge portion of the sub-frame member 70a against the edge portion of the main frame member 10a so as to connect the main frame member 10a and the sub-frame member 70a, the solar cell module 4a can be constituted using a frame member with a bottom piece of the frame member projecting from the lower edge of the frame member toward the solar cell panel 9 side (inner side) that is used for fixing this solar cell module 4a (the main bottom piece 16 of the main frame member 10a) and, also, needing the edge portion of only the main frame member 10a to be cut, which is one of the main frame member 10a and the sub-frame member 70a.

The solar cell module 1b to the solar cell module 1e according to Embodiments 2 to 5 that have been described above can be said to be modified examples of the solar cell module 1a according to Embodiment 1. That is, the solar cell modules 1b to 1e according to Embodiments 2 to 5 that have been described above are constituted by changing the shape of the main frame member 10a of the solar cell module 1a according to Embodiment 1 to the shapes of the main frame members 10b to 10e, respectively and, also, by changing the shape of the sub-frame member 20a to the shapes of the sub-frame members 20b to 20e, respectively.

In view of the above, also with the solar cell module 4a according to Embodiment 6 described above, by performing processing similar to the processing performed on the solar cell modules 1b to 1e according to Embodiments 2 to 5, on the main frame member 10a and the sub-frame member 70a, it is possible to constitute solar cell modules provided with features similar to the features with which the solar cell modules 1b to 1e according to Embodiments 2 to 5 are provided, as modified examples of the solar cell module 4a according to Embodiment 6.

<Embodiment 7>

Figure 31:
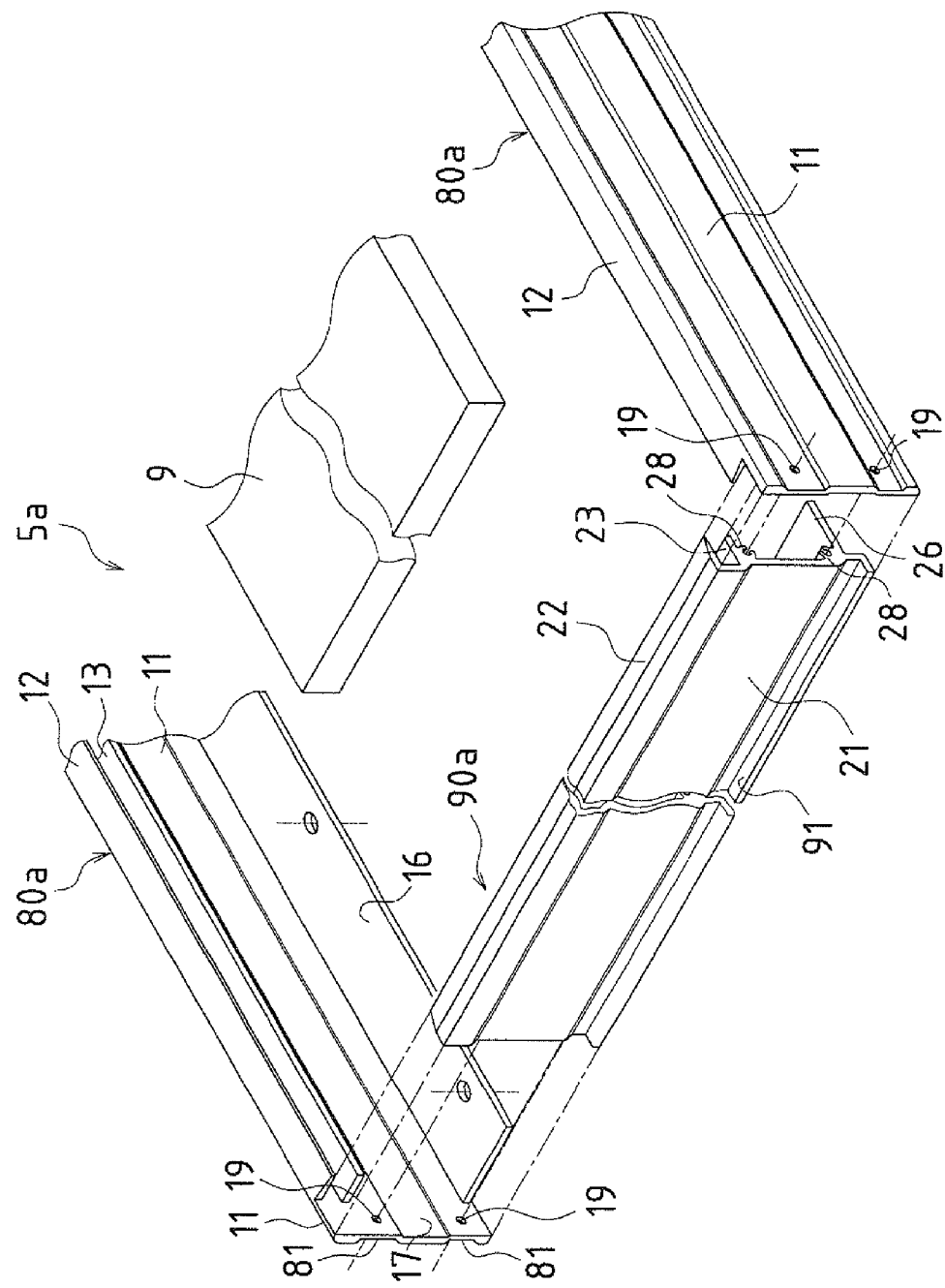
FIG. 31 is a partial exploded perspective view of a solar cell module according to Embodiment 7.
Figure 32:
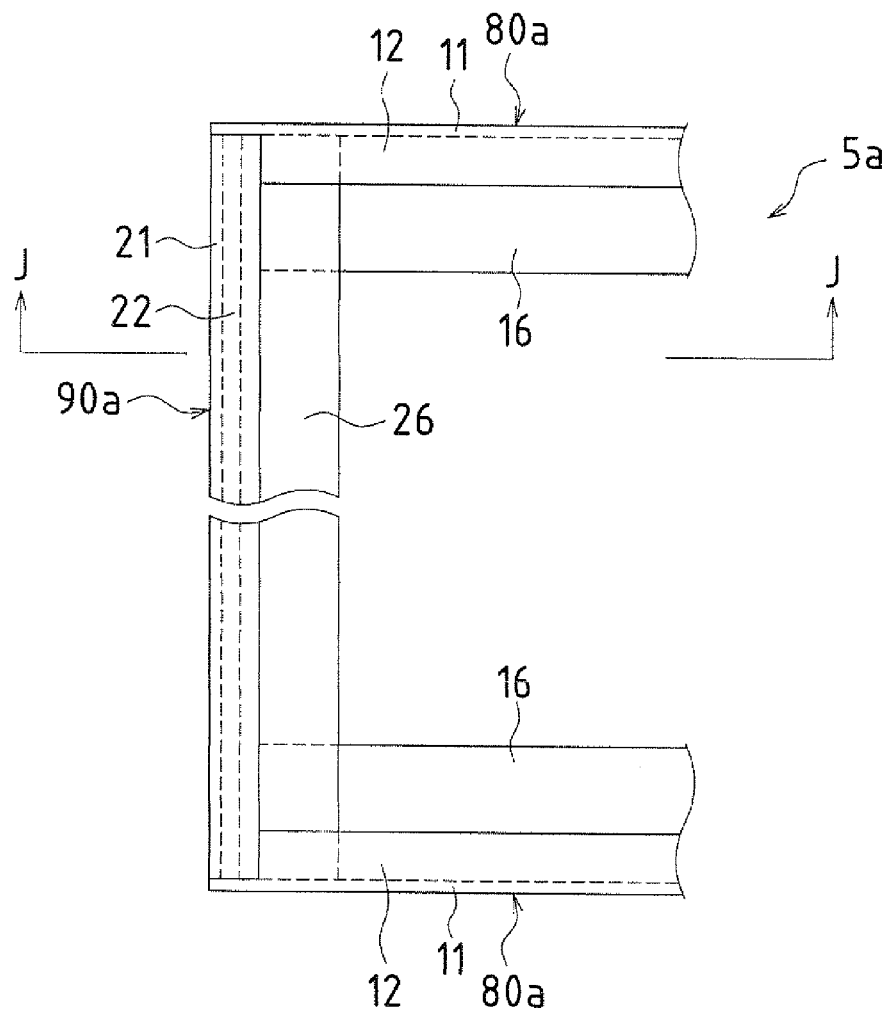
FIG. 32 is a partial plan view of the solar cell module according to Embodiment 7.
Figure 33:
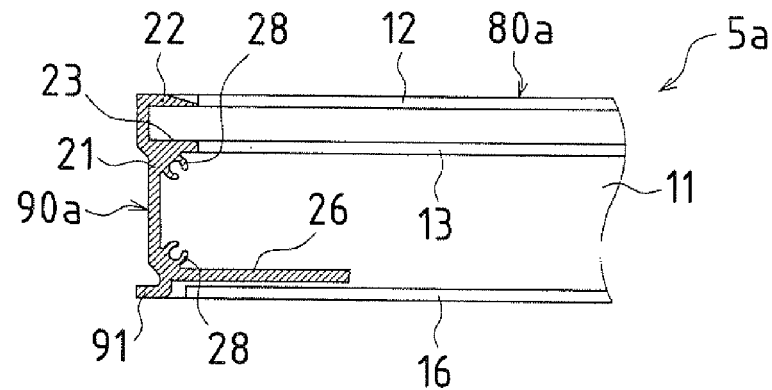
FIG. 33 is a cross-sectional view taken along J-J in FIG. 32.
Figure 34A:
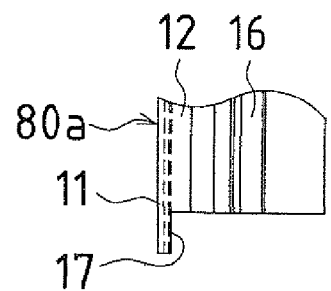
FIG. 34A is a partial plan view of an edge portion of a main frame member used for the solar cell module according to Embodiment 7.
Figure 34B:
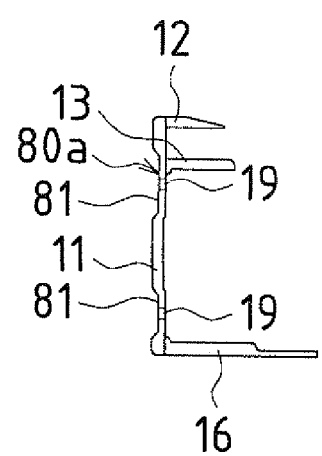
FIG. 34B is a front view of the edge portion of the main frame member used for the solar cell module according to Embodiment 7.
Figure 34C:
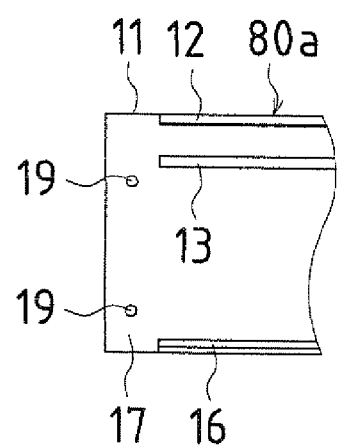
FIG. 34C is a partial side view of the edge portion of the main frame member used for the solar cell module according to Embodiment 7.
Figure 35A:
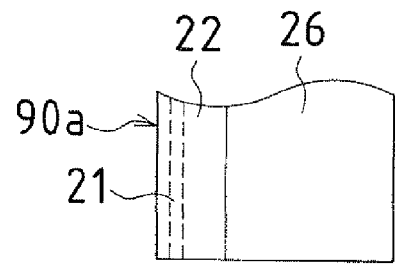
FIG. 35A is a partial plan view of an edge portion of a sub-frame member used for the solar cell module according to Embodiment 7.
Figure 35B:
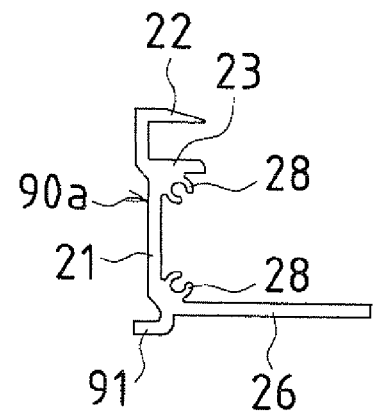
FIG. 35B is a front view of the edge portion of the sub-frame member used for the solar cell module according to Embodiment 7.
Figure 35C:
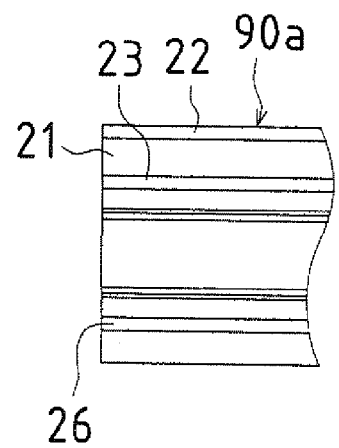
FIG. 35C is a partial side view of the edge portion of the sub-frame member used for the solar cell module according to Embodiment 7.

FIG. 31 is a partial exploded perspective view showing the structure of a solar cell module 5a according to Embodiment 7, FIG. 32 is a partial plan view thereof, and FIG. 33 is a cross-sectional view taken along J-J in FIG. 32. FIGS. 34A to 34C, and FIGS. 35A to 35C are drawings showing the shapes of edge portions of a main frame member 80a and a sub-frame member 90a that are used for this solar cell module 5a. FIGS. 34A and 35A are partial plan views, FIGS. 34B and 35B are front views, and FIGS. 34C and 35C are partial side views, respectively. Note that a solar cell panel 9 is omitted in FIGS. 32 and 33.

The basic structure of the solar cell module 5a according to Embodiment 7 is the same as that of the solar cell module 4a according to Embodiment 6. The solar cell module 5a according to Embodiment 7 differs from the solar cell module 4a according to Embodiment 6 in that the main frame member 80a is used instead of the main frame member 10a, and the sub-frame member 90a is used instead of the sub-frame member 70a.

Similar to the main frame member 10a of the solar cell module 4a according to Embodiment 6, the main frame member 80a is constituted from a main outer wall 11, a main holding upper piece 12, a main holding lower piece 13, and a main bottom piece 16. Among these, the main outer wall 11 is perpendicularly formed along one side of the solar cell panel 9. The main holding upper piece 12 and the main holding lower piece 13 are provided projecting horizontally with substantially the same length, above and below, to the inner side of the upper part of the main outer wall 11, and hold the solar cell panel 9 fitted therebetween.

Although the main frame member 80a is provided with screw holes 19 that are used for connecting the main frame member 80a and the sub-frame member 90a, a screw hole disposition wall 81 that is a portion of the main frame member 80*a* in the vicinity of the screw holes 19 provided is depressed inward for the amount corresponding to the thickness of the screw head of a pan head screw to be fitted in the screw hole 19, relative to other portions of the main frame member 80*a*. Accordingly, when the main frame member 80*a* and the sub-frame member 90*a* are connected, the head of the screw used for this connection does not jut outward, relative to the position of the outer surface of the above-mentioned other portions of the main frame member 80*a*.

Also, regarding the main frame member 80*a*, the top of the main outer wall 11 of the main frame member 80*a* is formed so as to be roundish, and the inner side edge of the main holding upper piece 12 is formed so as to be inwardly inclined aslant. Accordingly, when it is raining, even though the solar cell module 5*a* becomes wet in the rain, drainage with this solar cell module 5*a* can be improved.

Similar to the solar cell module 4*a* according to Embodiment 6, the sub-frame member 90*a* is constituted from a sub-outer wall 21, a sub-holding upper piece 22, a sub-holding lower piece 23, and a sub-bottom piece 26. Among these, the sub-outer wall 21 is perpendicularly formed along an adjoining side that adjoins the above-mentioned one side of the solar cell panel 9. The sub-holding upper piece 22 and, the sub-holding lower piece 23 are provided projecting horizontally with substantially the same length, above and below, to the inner side of the upper part of the sub-outer wall 21, and hold the solar cell panel 9 fitted therebetween. The sub-bottom piece 26 is formed on the inner side of the lower part of the sub-outer wall 21, along the sub-outer wall 21, projecting horizontally further than the sub-holding upper piece 22 and the sub-holding lower piece 23.

That is, with the solar cell module 5*a* according to Embodiment 7, the main bottom piece 16 of the main frame member 80*a* is formed projecting on the inner side of the lower edge of the main outer wall 11, and using the main bottom piece 16, the solar cell module 5*a* is fixed when installed. The sub-bottom piece 26 of the sub-frame member 90*a* is formed projecting on the inner side of the sub-outer wall 21 of the sub-frame member 90*a* so as to be positioned above the main bottom piece 16 of the main frame member 80*a*.

With the above-mentioned solar cell module 5*a*, by removing the main holding upper piece 12, the main holding lower piece 13, and the main bottom piece 16 in the edge portion of the main outer wall 11 of the main frame member 80*a* from the end edge of the main outer wall 11, only for the same width as the projecting length of the sub-holding upper piece 22 and the sub-holding lower piece 23 of the sub-frame member 90*a*, a flat main outer wall edge portion inner side surface 17 is formed on the inner side of the edge portion of the main outer wall 11. Then, the end surface of the edge portion of the sub-frame member 90*a* is abutted against the main outer wall edge portion inner side surface 17, and the main frame member 80*a* and the sub-frame member 90*a* are connected via screws using screw holes 19 and screw receptacles 28.

At this time, since the sub-bottom piece 26 of the sub-frame member 90*a* is formed projecting on the inner side of the sub-outer wall 21 of the sub-frame member 90*a*, so as to be positioned above the main bottom piece 16 of the main frame member 80*a* as described above, it is possible to connect the main bottom piece 16 of the main frame member 80*a*, and the sub-bottom piece 26 of the sub-frame member 90*a* so as not to collide with each other.

The lower portion of the sub-outer wall 21 of the sub-frame member 90*a* below the sub-holding lower piece 23 is depressed inward relative to the upper portion, and a sub-base outer piece 91 is formed bent outward at the lower edge of the sub-outer wall 21. As for the length in which this sub-base outer piece 91 is bent in the outside direction, the sub-outer wall 21 of the sub-frame member 90*a* is formed such that the outer side edge of the sub-base outer piece 91 is in the same plane as the surface position of the upper portion of the sub-outer wall 21 of the sub-frame member 90*a* above the sub-holding lower piece 23.

In view of this, if a plurality of the solar cell modules 5*a* according to Embodiment 7 are installed, for instance, the solar cell module 5*a* can be installed such that the outer side edge of the sub-base outer piece 91 of the sub-outer wall 21 of the sub-frame member 90*a* adjoins that of the adjoining solar cell module 5*a*. Therefore, the solar cell module 5*a* according to Embodiment 7 can be stably installed.

Also, when installing the solar cell module 5*a*, since it is possible to dispose the bottom surface of the main bottom piece 16 of the main frame member 80*a*, and the bottom surface of the sub-base outer piece 91 of the sub-frame member 90*a* on the same surface, both of the load imposed on the main frame member 80*a*, and the load imposed on the sub-frame member 90*a* can be supported by the mount on which the solar cell module 5*a* is installed, for instance. Therefore, the solar cell module 5*a* can be stably installed.

With the above-mentioned solar cell module 5*a*, similar to the solar cell module 4*a* according to Embodiment 6, the main bottom piece 16 of the main frame member 80*a* and the sub-bottom piece 26 of the sub-frame member 90*a* are formed so as not to collide with each other, such that the projecting position heights of the pieces are different, that is, such that the sub-bottom piece 26 of the sub-frame member 90*a* is positioned above the main bottom piece 16 of the main frame member 80*a*.

Accordingly, with the above-mentioned solar cell module 5*a*, if only the flat main outer wall edge portion inner side surface 17 is formed on the inner side of the edge portion of the main outer wall 11 by removing the main holding upper piece 12, the main holding lower piece 13, and the main bottom piece 16 in the edge portion of the main outer wall 11 of the main frame member 80*a* from the end edge of the main outer wall 12, for the same width as the projecting length of the sub-holding upper piece 22, and the sub-holding lower piece 23 of the sub-frame member 90*a*, it is possible to connect the main frame member 80*a* and the sub-frame member 90*a* by abutting the end surface of the edge portion of the sub-frame member 90*a* against the main outer wall edge portion inner side surface 17. That is, if only the main outer wall edge portion inner side surface 17 is formed by cutting the edge portion of the main outer wall 11 of the main frame member 80*a*, it is possible to connect the main frame member 80*a* and the sub-frame member 90*a*.

With the above-mentioned solar cell module 5*a*, the main bottom piece 16 of the main frame member 80*a* is used for fixing the solar cell module 5*a*. Therefore, regarding the solar cell module 5*a* that is formed by abutting the edge portion of the sub-frame member 90*a* against the edge portion of the main frame member 80*a* so as to connect the main frame member 80*a* and the sub-frame member 90*a*, the solar cell module 5*a* can be constituted using a frame member with a bottom piece of the frame member projecting from the lower edge of the frame member toward the solar cell panel 9 side (inner side) that is used for fixing this solar cell module 5*a* (the main bottom piece 16 of the main frame member 80*a*) and, also, needing the edge portion of only the main frame member 80*a* to be cut, which is one of the main frame member 80*a* and the sub-frame member 90*a*.

Further, as described in Embodiment 6, the solar cell modules 1*b* to 1*e* according to Embodiments 2 to 5 that have been described above can be said to be modified examples of the solar cell module 1a according to Embodiment 1. That is, the solar cell modules 1b to 1e according to Embodiments 2 to 5 that have been described above are constituted by changing the shape of the main frame member 10a of the solar cell module 1a according to Embodiment 1 to the shapes of the main frame members 10b to 10e, respectively and, also, by changing the shape of the sub-frame member 20a to the shapes of the sub-frame members 20b to 20e, respectively.

In view of the above, also with the solar cell module 5a according to Embodiment 7 described above, by performing processing similar to the processing performed on the solar cell modules 1b to 1e according to Embodiments 2 to 5, on the main frame member 80a and the sub-frame member 90a, it is possible to constitute solar cell modules provided with features similar to the features with which the solar cell modules 1b to 1e according to Embodiments 2 to 5 are provided, as modified examples of the solar cell module 5a according to Embodiment 7.

<Embodiment 8>

Figure 36:
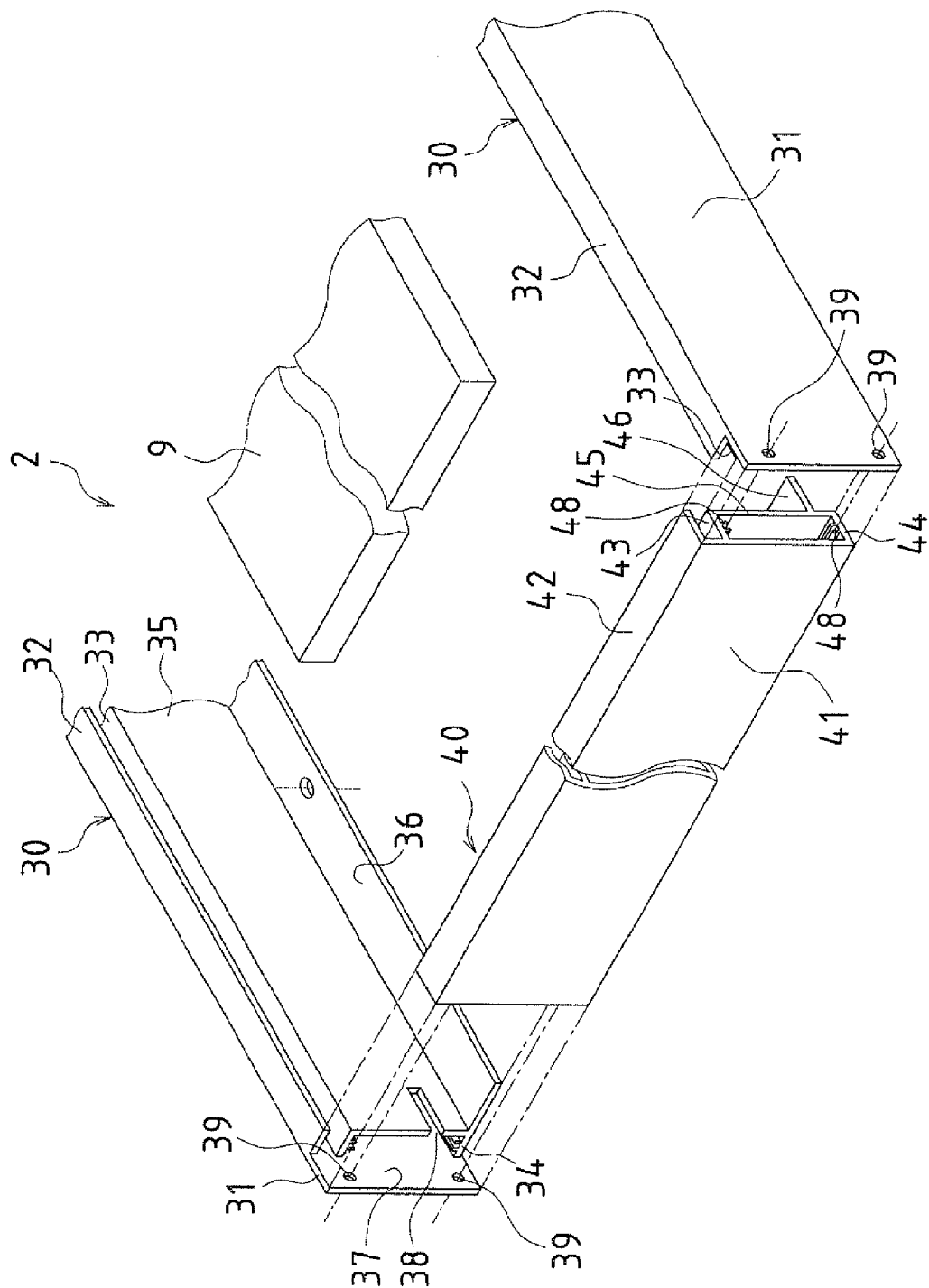
FIG. 36 is a partial exploded perspective view of a solar cell module according to Embodiment 8 of the present invention.
Figure 37:
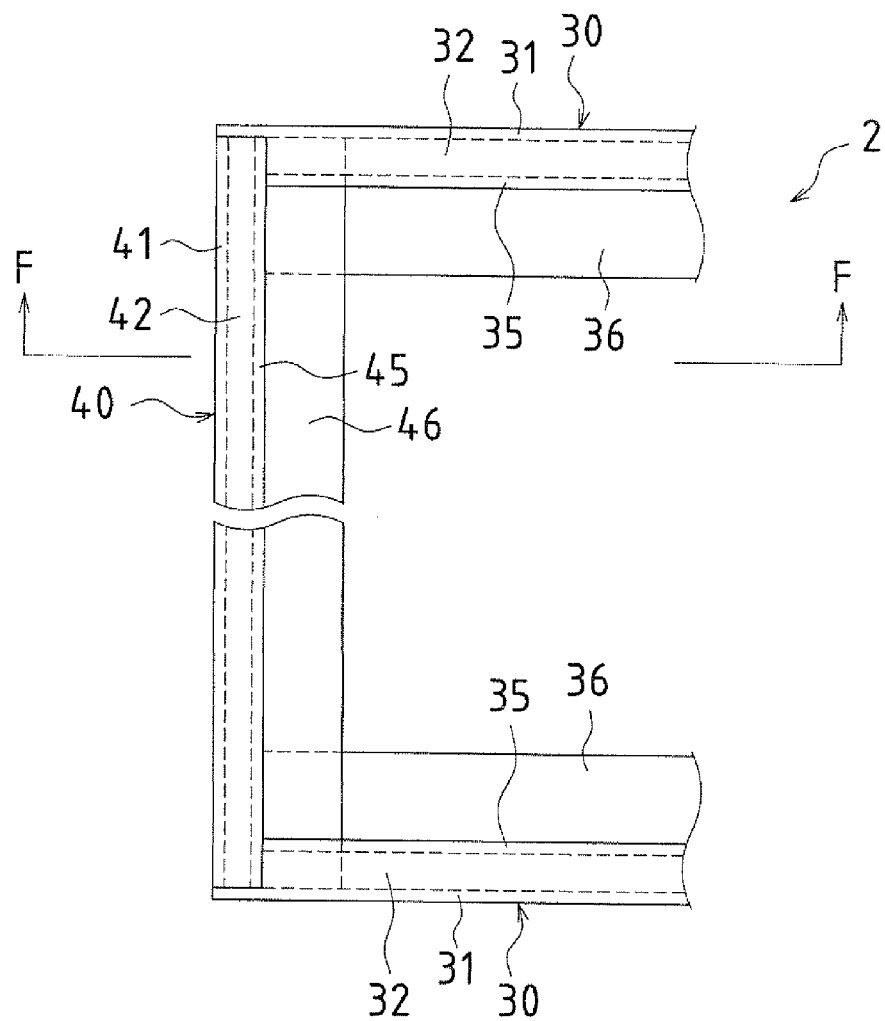
FIG. 37 is a partial plan view of the solar cell module according to Embodiment 8 of the present invention.
Figure 38:
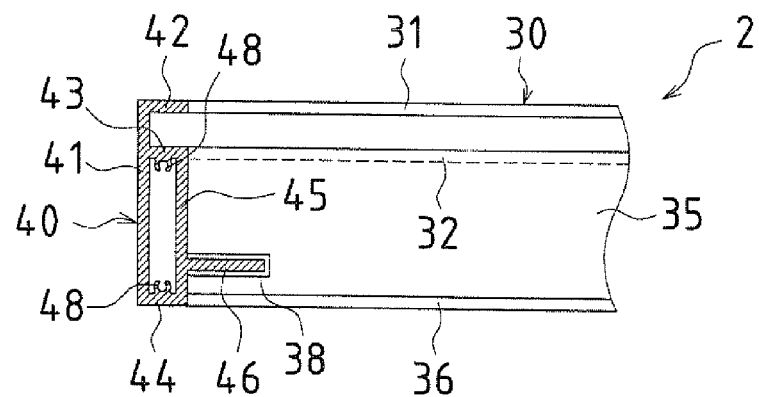
FIG. 38 is a cross-sectional view taken along F-F in FIG. 37.
Figure 39A:
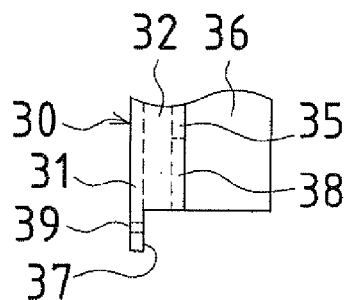
FIG. 39A is a partial plan view of an edge portion of a main frame member used for the solar cell module according to Embodiment 8 of the present invention.
Figure 39B:
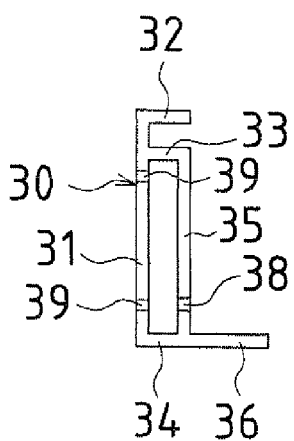
FIG. 39B is a front view of the edge portion of the main frame member used for the solar cell module according to Embodiment 8 of the present invention.
Figure 39C:
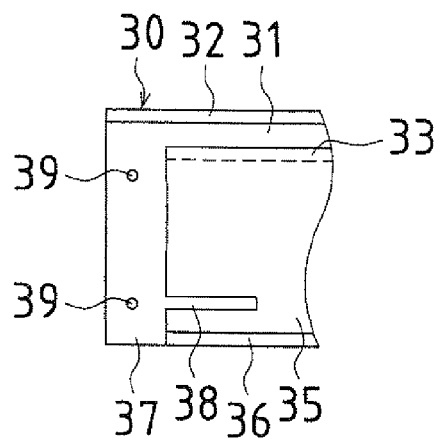
FIG. 39C is a partial side view of the edge portion of the main frame member used for the solar cell module according to Embodiment 8 of the present invention.
Figure 40A:
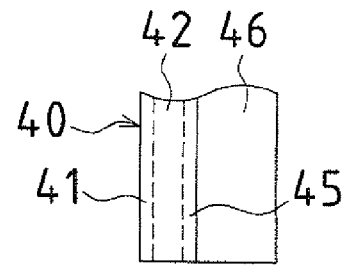
FIG. 40A is a partial plan view of an edge portion of a sub-frame member used for the solar cell module according to Embodiment 8 of the present invention.
Figure 40B:
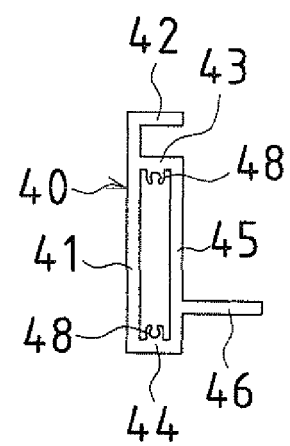
FIG. 40B is a front view of the edge portion of the sub-frame member used for the solar cell module according to Embodiment 8 of the present invention.
Figure 40C:
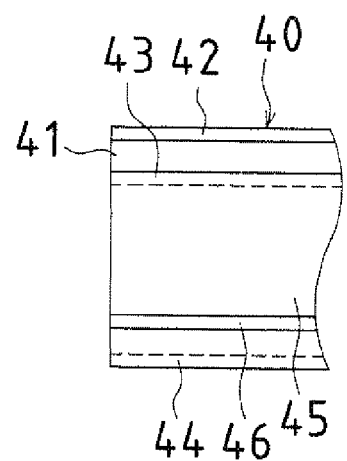
FIG. 40C is a partial side view of the edge portion of the sub-frame member used for the solar cell module according to Embodiment 8 of the present invention.
Figure 41:
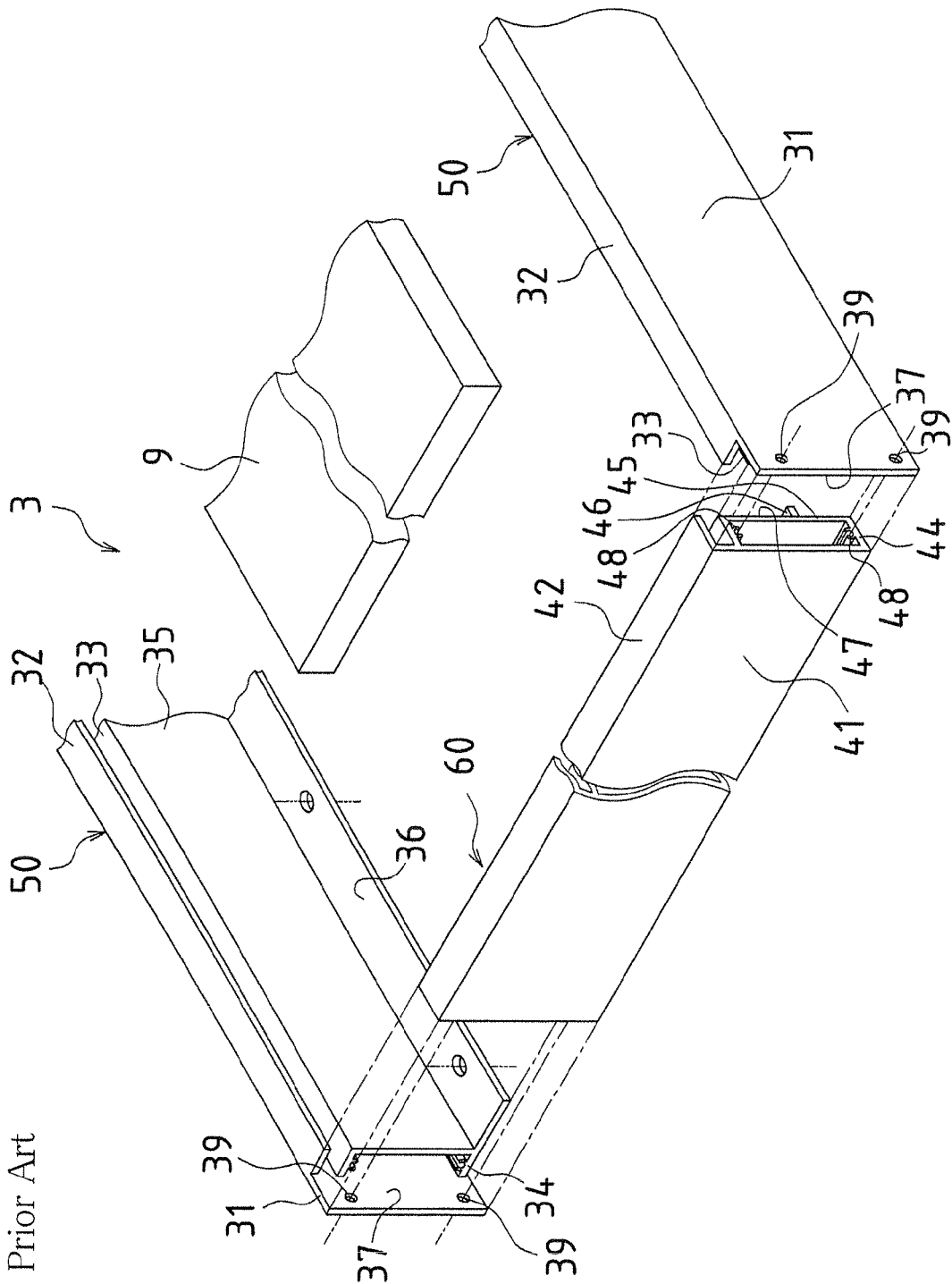
FIG. 41 is a partial exploded perspective view of a solar cell module of a conventional example.
Figure 42:
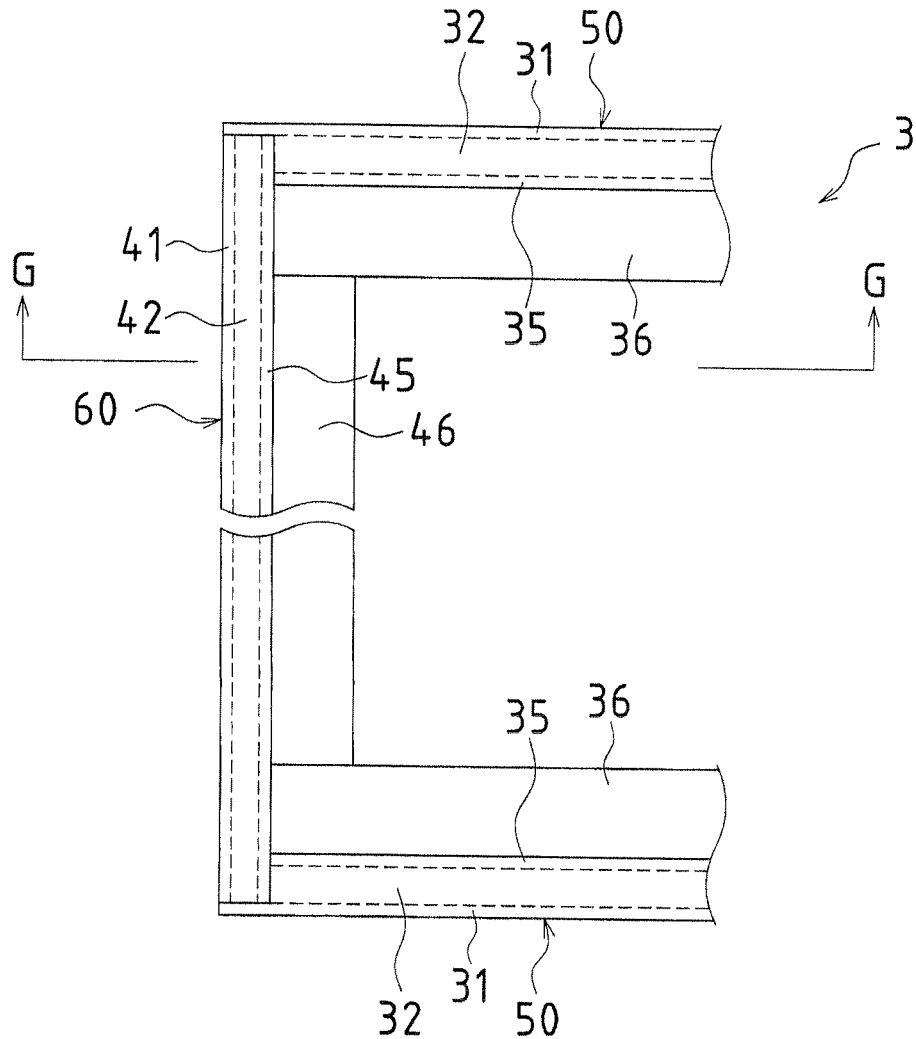
FIG. 42 is a partial plan view of the solar cell module according to the conventional example.
Figure 43:
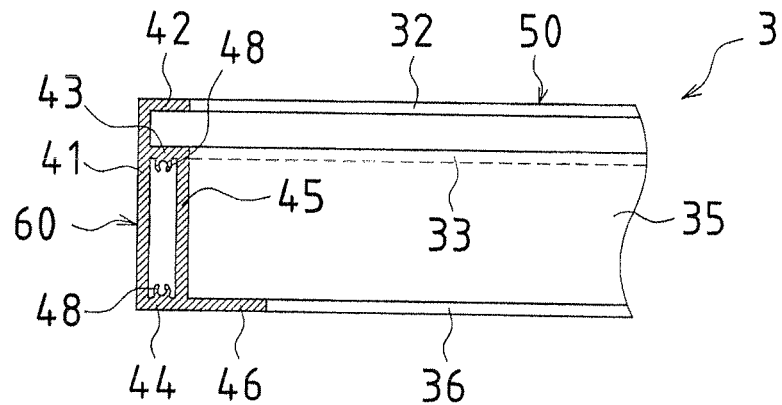
FIG. 43 is a cross-sectional view taken along G-G in FIG. 42.
Figure 44A:
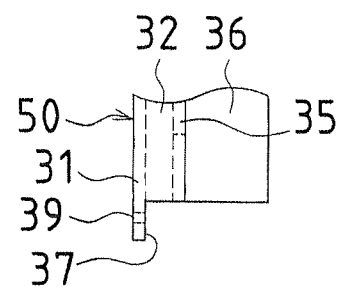
FIG. 44A is a partial plan view of an edge portion of a main frame member used for the solar cell module according to the conventional example.
Figure 44B:
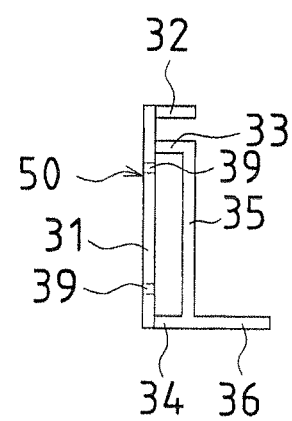
FIG. 44B is a front view of the edge portion of the main frame member used for the solar cell module according to the conventional example.
Figure 44C:
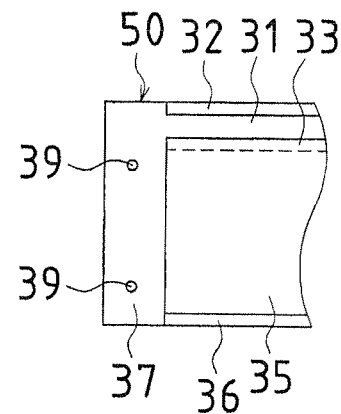
FIG. 44C is a partial side view of the edge portion of the main frame member used for the solar cell module according to the conventional example.
Figure 45A:
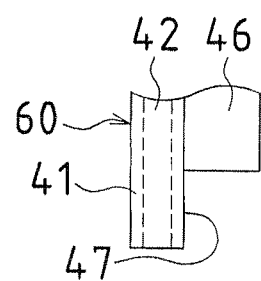
FIG. 45A is a partial plan view of an edge portion of a sub-frame member used for the solar cell module according to the conventional example.
Figure 45B:
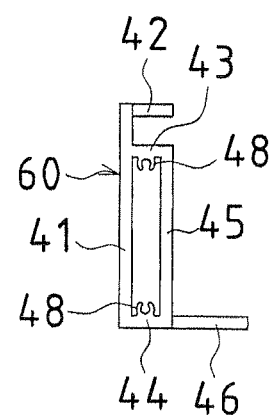
FIG. 45B is a front view of the edge portion of the sub-frame member used for the solar cell module according to the conventional example.
Figure 45C:
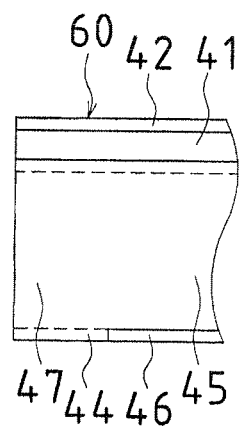
FIG. 45C is a partial side view of the edge portion of the sub-frame member used for the solar cell module according to the conventional example.

FIG. 36 is a partial exploded perspective view showing the structure of a solar cell module 2 according to Embodiment 8, FIG. 37 is a partial plan view thereof, and FIG. 38 is a cross-sectional view taken along F-F in FIG. 37. FIGS. 39A to 39C, and FIGS. 40A to 40C are drawings showing the shapes of edge portions of a main frame member 30 and a sub-frame member 40 that are used for this solar cell module 2. FIGS. 39A and 40A are partial plan views, FIGS. 39B and 40B are front views, and FIGS. 39C and 40C are partial side views, respectively. Note that a solar cell panel 9 is omitted in FIGS. 37 and 38.

The solar cell module 2 according to Embodiment 8 is a module obtained by improving the solar cell module 3 according to the conventional example by adopting the mechanism of the solar cell module 1a according to Embodiment 1 described above, that is, the mechanism in which, with the solar cell module 1a according to Embodiment 1 described above, the main bottom piece 16 of the main frame member 10a and the sub-bottom piece 26 of the sub-frame member 20a are formed so as not to collide with each other, such that the projecting position heights of the pieces are different, in the solar cell module 3 according to the conventional example described above.

This improved solar cell module is the solar cell module 2 according to Embodiment 8. In FIGS. 36 to 40C, the solar cell module 2 according to Embodiment 8 holds the solar cell panel 9 using two pairs of members, each pair constituted from the main frame member 30 that holds one side of the solar cell panel 9 and the sub-frame member 40 that holds an adjoining side that adjoins this one side.

The above-mentioned main frame member 30 is constituted from a main outer wall 31, a main holding upper piece 32, a main holding lower piece 33, a main base piece 34, a main inner wall 35, and a main bottom piece 36. Among these, the main outer wall 31 is perpendicularly formed along one side of the solar cell panel 9. The main holding upper piece 32 and the main holding lower piece 33 are provided projecting horizontally with substantially the same length, above and below, to the inner side of the upper part of the main outer wall 31, and hold the solar cell panel 9 fitted therebetween. The sub-base piece 34 is formed projecting horizontally on the inner side of the lower edge of the main outer wall 31, along the main outer wall 31. The main inner wall 35 is formed so as to be formed parallel to the main outer wall 31 connecting the edge of the main base piece 34 and the edge of the main holding lower piece 33. Then, the main bottom piece 36 is formed on the inner side of the lower edge of the main inner wall 31, along the main inner wall 31, projecting horizontally further than the main holding upper piece 32 and the main holding lower piece 33.

The above-mentioned sub-frame member 40 is constituted in a substantially similar manner to the above-mentioned main frame member 30, and is constituted from a sub-outer wall 41, a sub-holding upper piece 42, a sub-holding lower piece 43, a sub-base piece 44, a sub-inner wall 45, and a sub-bottom piece 46. Among these, the sub-outer wall 41 is perpendicularly formed along the adjoining side of the solar cell panel 9. The sub-holding upper piece 42 and the sub-holding lower piece 43 are provided projecting horizontally with substantially the same length, above and below, to the inner side of the upper part of the sub-outer wall 41, and hold the solar cell panel 9 fitted therebetween. The sub-base piece 44 is formed projecting horizontally on the inner side of the lower edge of the sub-outer wall 41, along the sub-outer wall 41. The sub-inner wall 45 is formed parallel to the sub-outer wall 41 connecting the edge of the sub-base piece 44, and the edge of the sub-holding lower piece 43. The sub-bottom piece 46 is formed on the inner side of the lower part of the sub-inner wall 45, along the sub-inner wall 45, projecting horizontally further than the sub-holding upper piece 42 and the sub-holding lower piece 43.

With the above-mentioned solar cell module 2, using the main bottom piece 36 of the main frame member 30, the solar cell module 2 is fixed when installed. Further, by removing the main holding upper piece 32, the main holding lower piece 33, the main inner wall 35, the main base piece 34, and the main bottom piece 36 in the edge portion of the main outer wall 31 of the main frame member 30 from the end edge of the main outer wall 31, only for the same width as the projecting length of the sub-holding upper piece 42, the sub-holding lower piece 43, and the sub-base piece 44 of the sub-frame member 40, a flat main outer wall edge portion inner side surface 37 is formed on the inner side of the edge portion of the main outer wall 31 of the main frame member 30. The end surface of the edge portion of the sub-frame member 40 is abutted against the main outer wall edge portion inner side surface 37, and the main frame member 30 and the sub-frame member 40 are connected via screws using screw holes 39 and screw receptacles 48.

At this time, the sub-bottom piece 46 of the sub-frame member 40 is formed projecting on the inner side of the sub-inner wall 45 of the sub-frame member 40 so as to be positioned above the main bottom piece 36 of the main frame member 30. Also, in the main inner wall 31 of the main frame member 30, a slit 38 that has the same length as the projecting length of this sub-bottom piece 46 is horizontally formed at the same height position as the projecting position of the sub-bottom piece 46 of the sub-frame member 40, and when the main frame member 30 and the sub-frame member 40 are connected, the sub-bottom piece 46 of the above-mentioned sub-frame member 40 is inserted into the slit 38.

With the above-mentioned solar cell module 2, as described above, the sub-bottom piece 46 of the sub-frame member 40 is formed projecting on the inner side of the sub-inner wall 45 of the sub-frame member 40 so as to be positioned above the main bottom piece 36 of the main frame member 30. Further, in the main inner wall 31 of the main frame member 30, the slit 38 having the same length as the projecting length of this sub-bottom piece 46 is horizontally formed at the same height position as the projecting position of the sub-bottom piece 46 of the sub-frame member 40, and when the main frame member 30 and the sub-frame member 40 are connected, the sub-bottom piece 46 of the above-mentioned sub-frame member 40 is inserted into this slit 38.

Therefore, when connecting the main frame member 30 and the sub-frame member 40, it is possible to avoid the main bottom piece 36 of the main frame member 30 and the sub-bottom piece 46 of the sub-frame member 40 colliding with each other.

Also, with the above-mentioned solar cell module 2, as described above, by removing the main holding upper piece 32, the main holding lower piece 33, the main inner wall 35, the main base piece 34, and the main bottom piece 36 in the edge portion of the main outer wall 31 of the main frame member 30 from the end edge of the main outer wall 31 of the main frame member 30, only for the same width as the projecting length of the sub-holding upper piece 42, the sub-holding lower piece 43, and the sub-base piece 44 of the sub-frame member 40, the flat main outer wall edge portion inner side surface 37 is formed on the inner side of the edge portion of the main outer wall 31 of the main frame member 30. Then, the end surface of the edge portion of the sub-frame member 40 is abutted against the main outer wall edge portion inner side surface 37, and the main frame member 30 and the sub-frame member 40 are connected. That is, if only the main outer wall edge portion inner side surface 37 is formed by cutting the edge portion of the main outer wall 31 of the main frame member 30, it is possible to connect the main frame member 30 and the sub-frame member 40.

Therefore, regarding the solar cell module 2 that is formed by abutting the edge portion of the sub-frame member 40 against the edge portion of the main frame member 30 so as to connect the main frame member 30 and the sub-frame member 40, it is possible to constitute a solar cell module 2 that can be constituted using a frame member with a bottom piece of the frame member projecting from the lower edge of the frame member toward the inner side that is used for fixing the solar cell module 2 (the main bottom piece 36 of the main frame member 30) and, also, needing the edge portion of only the main frame member 30 to be cut, which is one of the main frame member 30 and the sub-frame member 40.

Note that although in the above-mentioned embodiments, a description is given assuming that the solar cell panel 9 is in a horizontal state, the solar cell panel 9 may be in a perpendicular state, an inclined state, or the like, other than the horizontal state.

Further, although in the above-mentioned embodiments, all of the main holding upper piece 12 and the main holding lower piece 13 of the main frame member, and the sub-holding upper piece 22 and the sub-holding lower piece 23 of the sub-frame member have the substantially same length and are provided projecting horizontally, the length of the main holding upper piece 12, and the length of the main holding lower piece 13, or the length of the sub-holding upper piece 22 and the length of the sub-holding lower piece 23 may be different.

Further, in the above-mentioned embodiments, by removing the main holding upper piece 12, the main holding lower piece 13, and the main bottom piece 16 in the edge portion of the main outer wall 11 of the main frame member from the end edge of the main outer wall 11, only for the same width as the projecting length of the sub-holding upper piece 22, the sub-holding lower piece 23, and the like of the sub-frame member, the flat main outer wall edge portion inner side surface 17 is formed on the inner side of the edge portion of the main outer wall 11 of the main frame member. However, regarding the main bottom piece 16, other than the above-mentioned case, there may be a case in which depending on the shape of the sub-frame member to be connected to the main frame member, it is sufficient to remove, to an extent that the main bottom piece 16 does not interfere with this sub-frame member, a considerably shorter width than the projecting length of the sub-holding upper piece 22, the sub-holding lower piece 23, and the like of the sub-frame member from the end edge of the main outer wall 11.

The present invention may be embodied in various other forms without departing from the gist or essential characteristics thereof. Therefore, the embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

This application claims priority on Japanese Patent Application No. 2007-228378 filed in Japan on Sep. 3, 2007, the entire contents of which are incorporated herein by reference.

Industrial Applicability

The present invention can be applied to a solar cell module that is constituted from a solar cell panel and a frame member that holds this solar cell panel.

The invention claimed is:

1. A solar cell module that holds a solar cell panel using a plurality of pairs of members, each pair constituted from a main frame member that holds one side of the solar cell panel and a sub-frame member that holds an adjoining side that adjoins the one side, wherein the main frame member is formed comprising a main outer wall that is formed along one side of the solar cell panel, a main holding upper piece and a main holding lower piece that are provided projecting inward, above and below, to an inner side of an upper part of the main outer wall, and hold the solar cell panel fitted therebetween, and a main bottom piece that is formed on an inner side of the main outer wall below the main holding lower piece along the main outer wall, projecting further inward than the main holding upper piece and the main holding lower piece, the sub-frame member is formed comprising a sub-outer wall that is formed along the adjoining side of the solar cell panel, a sub-holding upper piece and a sub-holding lower piece that are provided projecting inward, above and below, to an inner side of an upper part of the sub-outer wall, and hold the solar cell panel fitted therebetween, a sub-base piece that is formed projecting inward on an inner side of a lower edge of the sub-outer wall along the sub-outer wall, a sub-inner wall that is formed parallel to the sub-outer wall connecting the sub-base piece and the sub-holding lower piece, and a sub-bottom piece that is formed on an inner side of the sub-inner wall along the sub-inner wall, projecting further inward than the sub-holding upper piece and the sub-holding lower piece, in the main outer wall of the main frame member, the main holding upper piece and the main holding lower piece are spaced from an end edge of the main outer wall, for substantially a same width as a projecting length of the sub-holding upper piece and the sub-holding lower piece of the sub-frame member along a length direction of the main outer wall, a flat main outer wall edge portion inner side surface is provided on an inner side of an edge portion of the main outer wall, an end surface of each edge portion of the sub-outer wall, the sub-holding upper piece, and sub-holding lower piece, the sub-base piece and the sub-inner wall of the sub-frame member is abutted against the main outer wall edge portion inner side surface, and an end surface of an edge portion of the sub-bottom piece is abutted against an inner side surface of the main outer wall except for the main outer wall edge portion inner side surface connecting the main frame member and the sub-frame member, and the main bottom piece and the sub-bottom piece extend substantially along a length of the main outer wall and the sub-outer wall, respectively, and are formed so as not to collide with each other, such that projecting position heights of the main bottom piece and the sub-bottom piece are different.

2. The solar cell module according to claim 1, wherein
the main bottom piece of the main frame member is formed projecting on an inner side of a lower edge of the main outer wall, and using the main bottom piece, the solar cell module is fixed when installed, and the sub-bottom piece of the sub-frame member is formed projecting inward, so as to be positioned above the main bottom piece.

3. The solar cell module according to claim 2, wherein
a protrusion for reinforcement is formed on a joint at which the main bottom piece of the main frame member projects from the lower edge of the main outer wall, and the sub-bottom piece of the sub-frame member is formed projecting inward so as to be positioned above the protrusion for reinforcement, in order not to collide with the protrusion for reinforcement.

4. The solar cell module according to claim 2, wherein
the sub-bottom piece of the sub-frame member is formed such that a lower surface near a side end of the sub-bottom piece abuts against an upper surface near a side end of the main bottom piece of the main frame member.

5. The solar cell module according to claim 1, wherein
the sub-bottom piece of the sub-frame member is formed projecting on an inner side of a lower edge of the sub-inner wall, and using the sub-bottom piece, the solar cell module is fixed when installed, and the main bottom piece of the main frame member is formed projecting on the inner side of the main outer wall, so as to be positioned above the sub-bottom piece.

6. The solar cell module according to claim 5,
wherein the main bottom piece of the main frame member is formed such that a lower surface near a side end of the main bottom piece abuts against an upper surface near a side end of the sub-bottom piece of the sub-frame member.

7. A solar cell module that holds a solar cell panel using a plurality of pairs of members, each pair constituted from a main frame member that holds one side of the solar cell panel and a sub-frame member that holds an adjoining side that adjoins the one side, wherein the main frame member is formed comprising a main outer wall that is formed along one side of the solar cell panel, a main holding upper piece and a main holding lower piece that are provided projecting inward, above and below, to an inner side of an upper part of the main outer wall, and hold the solar cell panel fitted therebetween, and a main bottom piece that is formed on an inner side of the main outer wall below the main holding lower piece along the main outer wall, projecting further inward than the main holding upper piece and the main holding lower piece, the sub-frame member is formed comprising a sub-outer wall that is formed along the adjoining side of the solar cell panel, a sub-holding upper piece and a sub-holding lower piece that are provided projecting inward, above and below, to an inner side of an upper part of the sub-outer wall, and hold the solar cell panel fitted therebetween, and a sub-bottom piece that is formed on an inner side of the sub-outer wall below the sub-holding lower piece along the sub-outer wall, projecting further inward than the sub-holding upper piece and the sub-holding lower piece, in the main outer wall of the main frame member, the main holding upper piece and the main holding lower piece are spaced from an end edge of the main outer wall, for substantially a same width as a projecting length of the sub-holding upper piece and the sub-holding lower piece of the sub-frame member along a length direction of the main outer wall, a flat main outer wall edge portion inner side surface is provided on an inner side of an edge portion of the main outer wall, and an end surface of each edge portion of the sub-outer wall, the sub-holding upper piece, the sub-holding lower piece and the sub-bottom piece of the sub-frame member is abutted against the main outer wall edge portion inner side surface, connecting the main frame member and the sub-frame member, and the main bottom piece and the sub-bottom piece extend substantially along a length of the main outer wall and the sub-outer wall, respectively, and are formed so as not to collide with each other, such that projecting position heights of the main bottom piece and the sub-bottom piece are different.

8. The solar cell module according to claim 7, wherein:
the sub-bottom piece of the sub-frame member is formed projecting on an inner side of a lower edge of the sub-outer wall, and using the sub-bottom piece, the solar cell module is fixed when installed, and the main bottom piece of the main frame member is formed projecting on the inner side of the main outer wall, so as to be positioned above the sub-bottom piece.

9. A solar cell module that holds a solar cell panel using a plurality of pairs of members, each pair constituted from a main frame member that holds one side of the solar cell panel and a sub-frame member that holds an adjoining side that adjoins the one side, wherein the main frame member is formed comprising a main outer wall that is formed along one side of the solar cell panel, a main holding upper piece and a main holding lower piece that are provided projecting inward, above and below, to an inner side of an upper part of the main outer wall, and hold the solar cell panel fitted therebetween, a main base piece that is formed projecting inward on an inner side of a lower edge of the main outer wall along the main outer wall, a main inner wall that is formed parallel to the main outer wall connecting the main base piece and the main holding lower piece, and a main bottom piece that is formed on an inner side of a lower edge of the main inner wall along the main inner wall, projecting further inward than the main holding upper piece and the main holding lower piece, the sub-frame member is formed comprising a sub-outer wall that is formed along the adjoining side of the solar cell panel, a sub-holding upper piece and a sub-holding lower piece that are provided projecting inward, above and below, to an inner side of an upper part of the sub-outer wall, and hold the solar cell panel fitted therebetween, a sub-base piece that is formed projecting inward on an inner side of a lower edge of the sub-outer wall along the sub-outer wall, a sub-inner wall that is formed parallel to the sub-outer wall connecting the sub-base piece and the sub-holding lower piece, and a sub-bottom piece that is formed on an inner side of the sub-inner wall along the sub-inner wall, projecting further inward than the sub-holding upper piece and the sub-holding lower piece, the solar cell module is fixed using the main bottom piece when installed, in the main outer wall of the main frame member, the main holding upper piece, the main holding lower piece, the main inner wall, the main base piece, and the main bottom piece are spaced from an end edge of the main outer wall, for substantially a same width as a projecting length of the sub-holding upper piece and the sub-holding lower piece of the sub-frame member along a length direction of the main outer wall, a flat main outer wall edge portion inner side surface is provided on an inner side of an the edge portion of the main outer wall, an end surface of each edge portion of sub-outer wall, the sub-holding upper piece, the sub-holding lower piece, the sub-base piece and the sub-inner wall of the sub-frame member is abutted against the main outer wall edge portion inner side surface, an end surface of edge portion of the sub-bottom piece is abutted against an inner side surface of the main outer wall except for the main outer wall edge portion inner side surface, connecting the main frame member and the sub-frame member, the sub-bottom piece of the sub-frame member is formed projecting on the inner side of the sub-inner wall, so as to be positioned above the main bottom piece of the main frame member, and in the main inner wall, a slit that has an open end and has a same length as a projecting length of the sub-bottom piece is formed, in a same height position as a projecting position of the sub-bottom piece, and when the main frame member and the sub-frame member are connected, the sub-bottom piece is inserted in the slit.

* * * * *